(12) United States Patent
Park et al.

(10) Patent No.: US 8,783,930 B2
(45) Date of Patent: Jul. 22, 2014

(54) DISPLAY DEVICE

(75) Inventors: Seung Ryong Park, Seoul (KR); Hyun Ho Choi, Seoul (KR); Gi Seok Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 174 days.

(21) Appl. No.: 13/440,562

(22) Filed: Apr. 5, 2012

(65) Prior Publication Data

US 2012/0257414 A1    Oct. 11, 2012

(30) Foreign Application Priority Data

Apr. 5, 2011   (KR) .................. 10-2011-0031333
May 11, 2011   (KR) .................. 10-2011-0044139
Jun. 23, 2011   (KR) .................. 10-2011-0061029

(51) Int. Cl.
   *F21V 7/04*    (2006.01)
(52) U.S. Cl.
   USPC ........... 362/611; 362/231; 362/615; 362/617; 362/621; 362/97.1; 349/61; 349/65
(58) Field of Classification Search
   USPC .............. 362/601, 602, 231, 558, 97.1, 84
   See application file for complete search history.

(56) References Cited

U.S. PATENT DOCUMENTS

| 8,084,934 | B2 | 12/2011 | Kim et al. |
| 2006/0072339 | A1 | 4/2006 | Li et al. |
| 2007/0036241 | A1 | 2/2007 | Sahinoglu et al. |
| 2007/0086184 | A1* | 4/2007 | Pugh et al. ............ 362/231 |
| 2007/0210326 | A1 | 9/2007 | Kurihara |
| 2008/0049443 | A1* | 2/2008 | Lee ........................ 362/608 |
| 2011/0134626 | A1 | 6/2011 | Pugh et al. |
| 2011/0141769 | A1 | 6/2011 | Lee et al. |

FOREIGN PATENT DOCUMENTS

| EP | 2061095 A1 | 5/2009 |
| JP | 10-319396 A | 12/1998 |
| JP | 2000-275636 A | 10/2000 |
| JP | 2001-297617 A | 10/2001 |
| JP | 2005-174567 A | 6/2005 |
| JP | 2006-108076 A | 4/2006 |
| JP | 2007-005098 A | 1/2007 |
| JP | 2007-149665 A | 6/2007 |
| JP | 2008-112711 A | 5/2008 |
| JP | 2009-505443 A | 2/2009 |
| KR | 10-2006-0114523 A | 11/2006 |
| KR | 10-2011-0012246 A | 2/2011 |
| KR | 10-2011-0064741 A | 6/2011 |
| KR | 10-2011-0068110 A | 6/2011 |
| WO | WO-2008/026699 A1 | 3/2008 |

OTHER PUBLICATIONS

Office Action dated Feb. 13, 2013 in Korean Application No. 10-2011-0044139, filed May 11, 2011.
Office Action dated Aug. 31, 2012 in Korean Application No. 10-2011-0061029, filed Jun. 23, 2011.
Office Action dated Aug. 17, 2012 in Korean Application No. 10-2011-0044139, filed May 11, 2011.
Office Action dated Jul. 2, 2013 in Japanese Application No. 2012-086779, filed Apr. 5, 2012.

* cited by examiner

*Primary Examiner* — Ali Alavi
(74) *Attorney, Agent, or Firm* — Saliwanchik, Lloyd & Eisenschenk

(57) ABSTRACT

Disclosed is a display device. The display device includes a light source, a light guide part to receive a light emitted from the light source, a light conversion member between the light source and the light guide part, and a spacer between the light source and the light conversion member.

19 Claims, 20 Drawing Sheets

DISPLAY DEVICE

CROSS-REFERENCE TO RELATED APPLICATIONS

This application claims the benefit under 35 U.S.C. §119 of Korean Patent Application Nos. 10-2011-0031333, filed Apr. 5, 2011; 10-2011-0044139, filed May 11, 2011; and 10-2011-0061029, filed Jun. 23, 2011, which are hereby incorporated by reference in their entirety.

BACKGROUND

The embodiment relates to a display device.

A light emitting diode (LED) is a semiconductor device that converts electricity into ultraviolet ray, visible ray or infrared ray by using characteristics of compound semiconductors. The LED is mainly used for home appliances, remote controllers and large-size electric signboards.

A high-brightness LED is used as a light source for a lighting device. Since the LED represents the superior energy efficiency and long life span, the replacement cost thereof may be reduced. In addition, the LED is strong against vibration and impact and it is not necessary to use toxic substances, such as Hg, so the LED substitutes for a glow lamp and a fluorescent lamp in terms of energy saving, environmental protection and cost reduction.

In addition, the LED may be advantageously used as a light source for a middle-size or large-size LCD TV and a monitor. When comparing with a cold cathode fluorescent lamp (CCFL) mainly used in a liquid crystal display (LCD), the LED represents superior color purity and low power consumption and can be fabricated in a small size, so various products equipped with the LED have been produced and studies for the LED have been actively performed.

BRIEF SUMMARY

The embodiment provides a display device which has a simple structure, is easily manufactured, and represents improved brightness, durability, color representation, and reliability.

According to the embodiment, there is provided a display device including a light source, a light guide part to receive a light emitted from the light source, a light conversion member between the light source and the light guide part, and a spacer between the light source and the light conversion member.

According to the embodiment, there is provided a display device including a light guide plate, a light source at one side of the light guide plate, a light conversion member in a groove or a hole defined in the light guide plate, and a display panel on the light guide plate.

According to the embodiment, there is provided a display device including a light guide plate, a light source to emit a light to the light guide plate, a light conversion member in the light guide plate, and a display panel on the light guide plate. The light guide plate directly adheres to at least one surface of the light conversion member.

As described above, the display device according to the embodiment includes the spacer. The light source is spaced apart from the light conversion member by the spacer. Therefore, the light source is sufficiently spaced apart from the light conversion member so that the light emitted from the light source can be incident onto the light conversion member in a sufficiently diffused state.

Therefore, the liquid crystal display according to the embodiment can inhibit the light emitted from the light source from being intensively into a part of the light conversion member. Therefore, since the liquid crystal display according to the embodiment allows the light to be uniformly incident into the light conversion member, the denaturalization of the light conversion particles caused by the intensively incident light can be inhibited.

In addition, the light source can be sufficiently spaced apart from the light conversion member by the spacer, so that the heat emitted from the light source can be inhibited from being transferred to the light conversion member. Therefore, the light conversion member can be inhibited from being degraded by the heat emitted from the light source.

Therefore, the display device according to the embodiment can represent improved life span and improved durability.

In addition, in the optical member according to the embodiment, the light conversion member is provided in the light guide plate. In other words, the light conversion member is inserted into the light guide plate. Accordingly, the light guide plate can be integrally formed with the light conversion member. Therefore, the light conversion member and the light guide plate can be simply assembled in order to manufacture the display device according to the embodiment.

In addition, the light conversion member can directly adhere to the light guide plate. Accordingly, the light loss between the light conversion member and the light guide plate can be minimized. Therefore, the display device according to the embodiment can represent improved brightness and improved color representation.

In addition, since the light conversion member is provided in the light guide plate, the light conversion member can be effectively protected by the light guide plate. In particular, the light conversion member can be effectively protected from external physical impact and external chemical impact by the light guide plate.

Therefore, the display device according to the embodiment can represent improved reliability and improved durability.

In addition, according to the display device according to the embodiment, at least two light conversion members can be inserted into the top and the bottom of the light guide plate, respectively. Therefore, almost all of lights emitted from the light source can pass through the light conversion members.

Therefore, the display device according to the embodiment can represent improved color representation.

DETAILED DESCRIPTION

Figure 1:
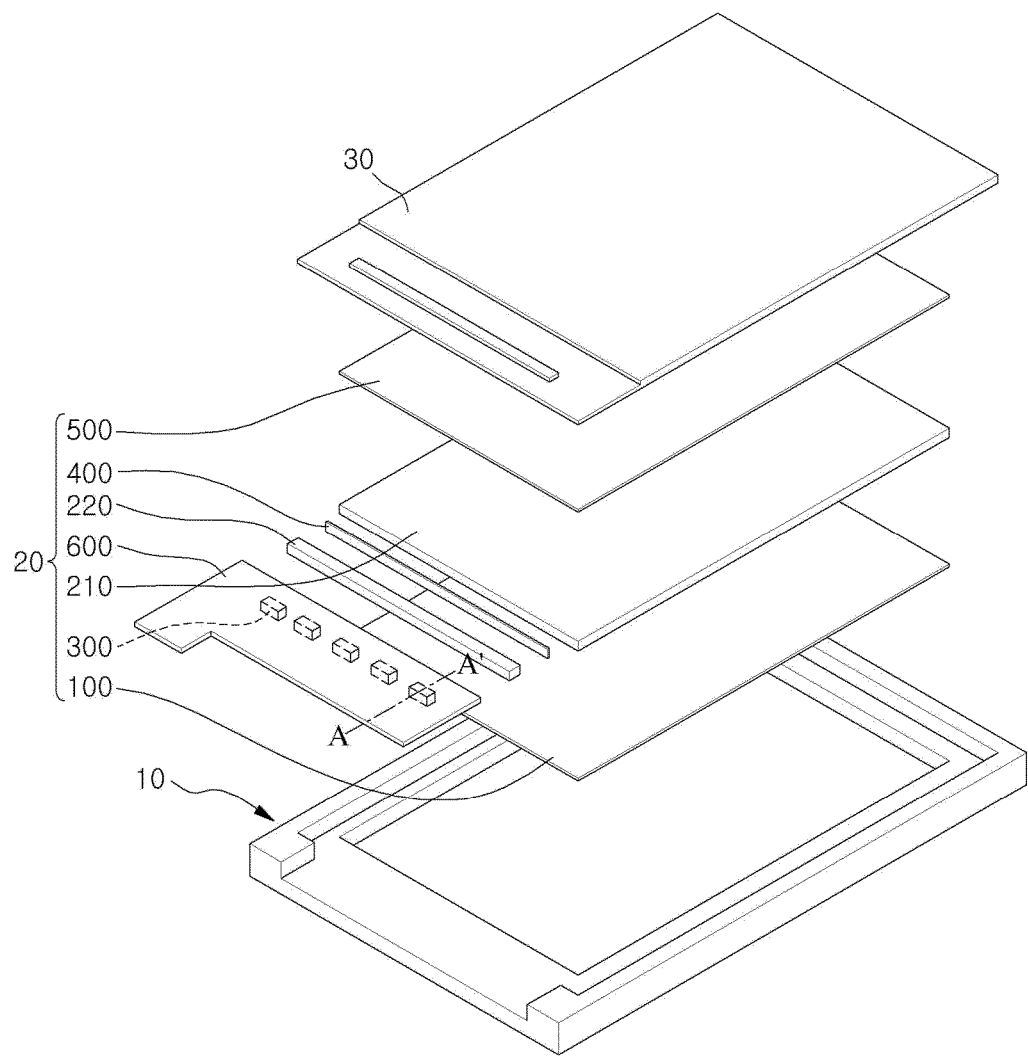
FIG. 1 is an exploded perspective view showing a liquid crystal display according to a first embodiment.

In the description of the embodiments, it will be understood that when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
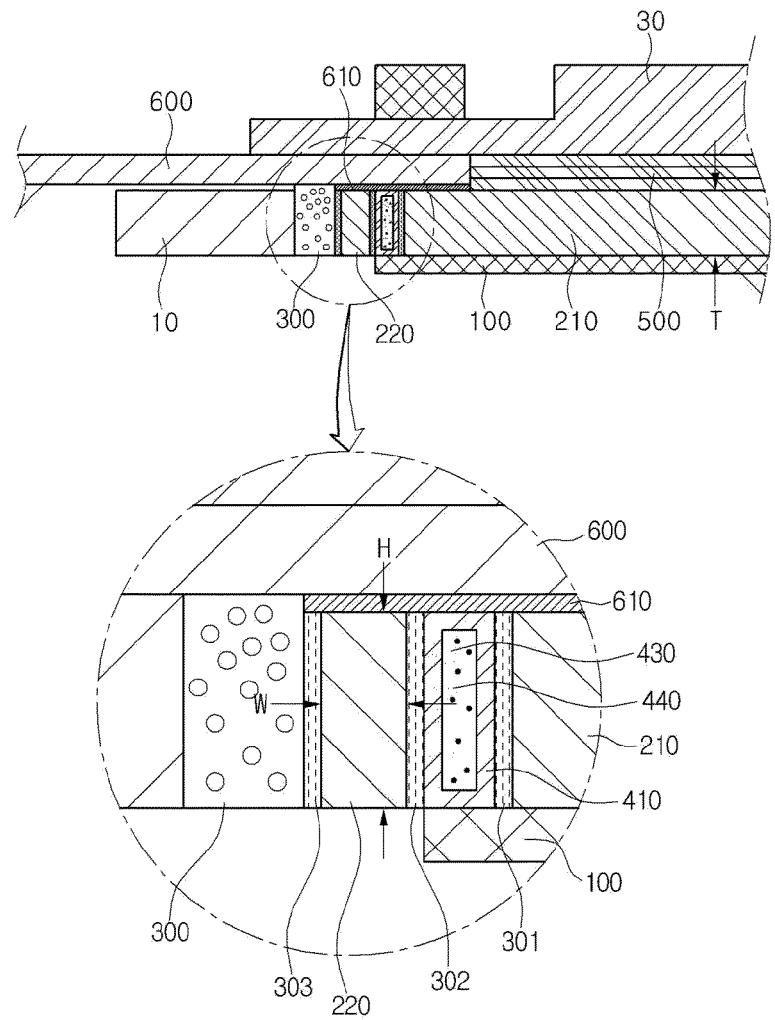
FIG. 2 is a sectional view taken along line A-A' of FIG. 1.
Figure 3:
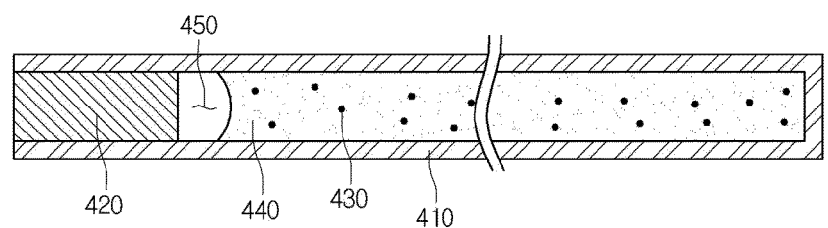
FIG. 3 is a sectional view showing a light conversion member according to the first embodiment.
Figure 4:
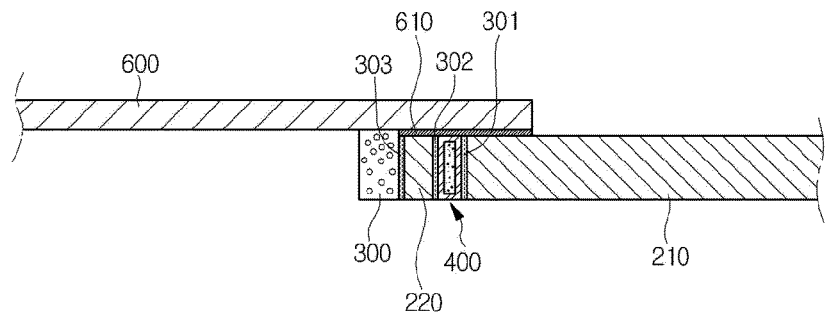
FIG. 4 is a sectional view showing a light emitting diode, a spacer, a light conversion member, and a light guide part according to the first embodiment.

FIG. 1 is an exploded perspective view showing a liquid crystal display according to a first embodiment, FIG. 2 is a sectional view taken along line A-A' of FIG. 1, FIG. 3 is a sectional view showing a light conversion member according to the first embodiment, and FIG. 4 is a sectional view showing a light emitting diode, a spacer, a light conversion member, and a light guide part according to the first embodiment.

Referring to FIGS. 1 to 4, a liquid crystal display according to the embodiment includes a mold frame 10, a backlight assembly 20, and a liquid crystal panel 30. The mold frame 10 receives the backlight assembly 20 and the liquid crystal panel 30 therein. The mold frame 10 has the shape of a rectangular frame. For example, the mold frame 10 may include plastic or enhanced plastic.

In addition, a chassis may be provided under the mold frame 10 to surround the mold frame 10 while supporting the backlight assembly 20. The chassis may be provided at the lateral sides of the mold frame 10.

The backlight assembly 20 is provided inside the mold frame 10, and generates a light to emit toward the liquid crystal panel 30. The backlight assembly 20 includes a reflective sheet 100, a light guide part 210, a light emitting diode 300, a light conversion member 400, a spacer 220, a plurality of optical sheets 500 and a flexible printed circuit board (FPCB) 600.

The reflective sheet 100 reflects light emitted from the light emitting diode 300 upward.

The light guide part 210 is provided on the reflective sheet 100. The light guide part 210 receives light emitted from the light emitting diode 300 to reflect the light upward through reflection, refraction, and scattering. The light guide part 210 includes a light guide plate to guide a light emitted from the light emitting diode 300.

The light guide part 210 has an incident surface facing the light emitting diode 300. In other words, a lateral side of the light guide part 210 facing the light emitting diode 300 serves as the incident surface.

The light guide diode 300 is provided at a lateral side of the light guide part 210. In detail, the light emitting diode 300 is provided at the light incident surface.

The light emitting diode 300 serves as a light source to generate a light. In detail, the light emitting diode 300 emits a light toward the light conversion member 400.

The light emitting diode 300 may include a blue light emitting diode 300 to emit blue light or an UV light emitting diode 300 to emit ultra-violet light. In other words, the light emitting diode 300 may emit blue light having a wavelength band of about 430 nm to about 470 nm, and may emit ultra-violet light having a wavelength band of about 300 nm to about 400 nm.

The light emitting diode 300 is mounted on the FPCB 600. The light emitting diode 300 is mounted on a bottom surface of the FPCB 600. The light emitting diode 300 receives a driving signal through the FPCB 600.

The light conversion member 400 is interposed between the light emitting diode 300 and the light guide part 210. In detail, the light conversion member 400 is interposed between the spacer 220 and the light guide part 210.

As shown in FIG. 4, the light conversion member 400 adheres to the lateral side of the light guide part 210. In detail, the light conversion member 400 is attached to the incident surface of the light guide part 210. In addition, the light conversion member 400 may adhere to the spacer 220.

In other words, the light conversion member 400 may be attached to the light guide part 210 by a first adhering member 301, and may be attached to the spacer 220 by a second adhering member 302. The first adhering member 301 may adhere to the light conversion member 400 and the light guide part 210. In addition, the first adhering member 301 may adhere to the light conversion member 400 and the spacer 220.

In addition, the light emitting diode 300 may be attached to the spacer 220. In this case, a third adhering member 303 may be interposed between the light emitting diode 300 and the spacer 220. The third adhering member 303 may adhere to the light emitting diode 300 and the spacer 220.

The light conversion member 400 receives a light emitted from the light emitting diode 300 to change the wavelength of the light. For example, the light conversion member 400 may change a blue light emitted from the light emitting diode 300 to a green light and a red light. In other words, the light conversion member 400 may change a part of the blue light into the green light having a wavelength band of about 520 nm to about 560 nm, and changes another part of the blue light to the red light having a wavelength band of about 630 nm to about 660 nm.

In addition, the light conversion member 400 may convert the UV light emitted from the light emitting diodes 300 into the blue light, the green light and the red light. In detail, the light conversion member 400 may convert a part of the UV light into the blue light having the wavelength of about 430 nm to about 470 nm, another part of the UV light into the green light having the wavelength of about 520 nm to about 560 nm, and another part of the UV light into the red light having the wavelength of about 630 nm to about 660 nm.

Therefore, the white light can be generated by the light passing through the light conversion member 400 and the lights converted by the light conversion member 400. In detail, the white light can be incident into the light guide part 210 through the combination of the blue light, the green light and the red right.

As shown in FIGS. 2 and 3, the light conversion member 400 includes a tube 410, a sealing part 420, a plurality of light conversion particles 430, and a matrix 440.

The tube 410 receives the sealing part 420, the light conversion particles 430 and the matrix 440 therein. That is, the tube 410 may serve as a receptacle to receive the sealing part 420, the light conversion particles 430 and the matrix 440. In addition, the tube 410 extends in one direction with a long length.

The tube 410 may have the shape of a rectangular tube. In detail, a section of the tube 410, which is vertical to the length direction of the tube 410, may have the rectangular shape.

The tube 410 may have a width of about 0.6 mm and a height of about 0.2 mm. In other words, the tube 410 may include a capillary tube.

The tube 410 is transparent. The tube 410 may include glass. In other words, the tube 410 may include a glass capillary tube.

The sealing part 420 is provided in the tube 410. The sealing part 420 is provided at an end portion of the tube 410. The sealing part 410 seals the inner part of the tube 410. The sealing part 420 may include epoxy resin.

The light conversion particles 430 are contained in the tube 410. In detail, the light conversion particles 430 are uniformly dispersed in the matrix 440, and the matrix 440 is provided in the tube 410.

The light conversion particles 430 convert wavelengths of lights emitted from the light emitting diode 300. The light conversion particles 430 receive the light emitted from the light emitting diode 300 to convert the wavelengths of the light. For instance, the light conversion particles 430 may convert the blue light emitted from the light emitting diodes 300 into the green light and the red light. That is, a part of the light conversion particles 430 may convert the blue light into the green light having the wavelength of about 520 nm to about 560 nm and another part of the light conversion particles 430 converts the blue light into the red light having the wavelength of about 630 nm to about 660 nm.

In addition, the light conversion particles 430 can convert the UV light emitted from the light emitting diodes 300 into the blue light, the green light and the red light. That is, a part of the light conversion particles 430 converts the UV light into the blue light having the wavelength in the range of about 430 nm to about 470 nm, and another part of the light conversion particles 430 converts the UV light into the green light having the wavelength in the range of about 520 nm to about 560 nm. Further, a part of the light conversion particles 430 converts the UV light into the red light having the wavelength in the range of about 630 nm to about 660 nm.

In other words, if the light emitting diodes 300 are blue light emitting diodes that emit the blue light, the light conversion particles 430 capable of converting the blue light into the green light and the red light may be employed. In addition, if the light emitting diodes 300 are UV light emitting diodes that emit the UV light, the light conversion particles 430 capable of converting the UV light into the blue light, the green light and the red light may be employed.

The light conversion particles 430 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals may be prepared as at least two layers. The shell nano-crystals are formed on the surface of the core nano-crystals. The quantum dots can lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In detail, the core nano-crystals may include Cdse, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is in the non-bonding state, one end of the organic ligand in the non-bonding state is bonded with the dangling bonds, thereby stabilizing the quantum dots.

In particular, if the size of the quantum dot is smaller than the Bohr radius of an exciton, which consists of an electron and a hole excited by lights and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient, which is 100 to 1000 times higher than that of the general fluorescent pigment, and has the superior quantum yield as compared with the general fluorescent pigment, so that that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The matrix 440 surrounds the light conversion particles 430. In detail, the light conversion particles 430 are uniformly distributed in the matrix 440. The matrix 440 includes polymer. The matrix 440 is transparent. That is, the matrix 440 may include transparent polymer.

The matrix 440 is disposed in the tube 410. In detail, the matrix 440 is fully filled in the tube 410. The matrix 440 may adhere to an inner surface of the tube 410.

An air layer 450 is formed between the sealing part 420 and the matrix 440. The air layer 450 is filled with nitrogen. The air layer 450 performs the damping function between the sealing part 420 and the matrix 440.

The light conversion member 400 may be formed through the following scheme.

First, the light conversion particles 430 are uniformly dispersed in the resin composition. The resin composition is transparent. The resin composition may have a photo-curable property.

Then, internal pressure of the tube 410 having a scattering pattern 411 is reduced, an inlet of the tube 410 is immersed in the resin composition in which the light conversion particles 430 are distributed, and ambient pressure is increased. Thus, the resin composition having the light conversion particles 430 distributed therein is introduced into the tube 410.

Thereafter, a part of the resin composition introduced into the tube 410 is removed and the inlet of the tube 410 becomes empty.

Then, the resin composition introduced into the inlet of the tube 410 is cured by UV light so that the matrix 440 may be formed.

Next, epoxy resin composition is introduced into the inlet of the tube 410. Then, the epoxy resin composition is cured so that the sealing member 420 is formed. The process for forming the sealing member 420 is performed under the nitrogen atmosphere, so the air layer 450 including nitrogen is formed between the sealing member 420 and the matrix 440.

As shown in FIG. 4, the spacer 220 is interposed between the light emitting diodes 300 and the light conversion member 400. The spacer 220 spaces the light conversion member 400 apart from the light emitting diodes 300.

In other words, the interval between the light emitting diode 300 and the light conversion member 400 may be greater than a width W of the spacer 220. For example, the width W of the spacer 220 may be in the range of about 200 μm to about 2.5 mm. In detail, the width W of the spacer 220 may be in the range of about 600 μm to about 2.5 mm. In more detail, the width W of the spacer 220 may be in the range of about 1 mm to about 2.5 mm.

A height H of the spacer 220 may be substantially equal to a thickness T of the light guide part 210. In addition, the spacer 220 is transparent. The spacer 220 may include transparent polymer or glass. In addition, the refractive index of the spacer 220 may correspond to the refractive index of the light guide part 210. In other words, the refractive index of the spacer 220 may be substantially equal to the refractive index of the light guide part 210.

The optical sheets 500 are provided on the light guide part 210. The optical sheets 500 improve the characteristic of a light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide part 210.

The FPCB 600 may adhere to the light guide part 210. In other words, a double-sided adhesive tape may be interposed between the FPCB 600 and the light guide part 210, so that the FPCB 600 may adhere to the light guide part 210.

The mold frame 10 and the backlight assembly 20 constitute the backlight unit. That is, the backlight unit includes the mold frame 10 and the backlight assembly 20.

The liquid crystal panel 30 is provided inside the mold frame 10, and provided on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

As described above, the light emitting diode 300 is spaced apart from the light conversion member 400 by the spacer 220. Accordingly, the light emitting diode 300 is sufficiently spaced apart from the light conversion member 400, so that the light emitted from the light emitting diode 300 can be incident into the light conversion member 400 in the sufficiently diffused state.

Therefore, the liquid crystal display according to the embodiment can inhibit the light emitted from the light emitting diode 300 from being intensively into a part of the light conversion member 400. Therefore, since the liquid crystal display according to the embodiment allows the light to be uniformly incident into the light conversion member 400, the denaturalization of the light conversion particles caused by the intensively incident light can be inhibited.

In other words, the liquid crystal display according to the embodiment can inhibit a part of the light conversion particles from being degraded due to the intensive light irradiation onto the part of the light conversion particles.

In addition, the spacer 220 can enhance the strength of the light conversion member 400. In other words, the light conversion member 400 is sandwiched between the spacer 220 and the light guide part 210 to protect the light conversion member 400. Especially, if the tube 410 includes glass, the tube 410 is breakable. In this case, since the spacer 220 protects the tube 410, the liquid crystal display according to the embodiment can represent improved strength.

Therefore, the display device according to the embodiment can represent improved life span and improved durability.

Figure 5:
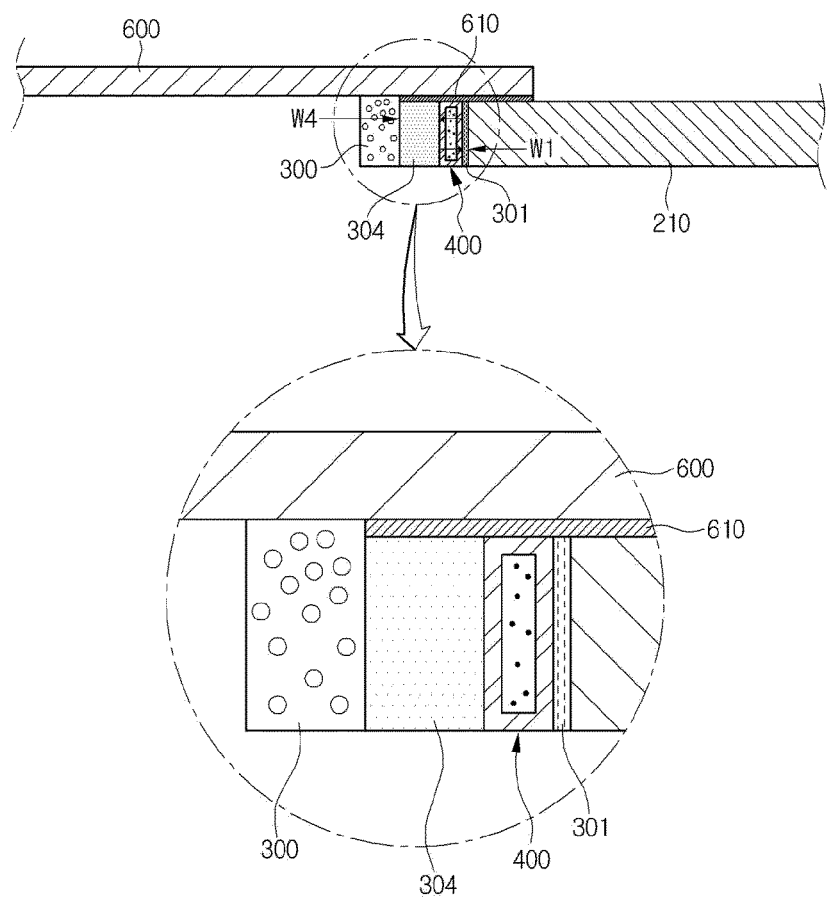
FIG. 5 is a sectional view showing a light emitting diode, an adhering member, a light conversion member, and a light guide plate according to a second embodiment.
Figure 6:
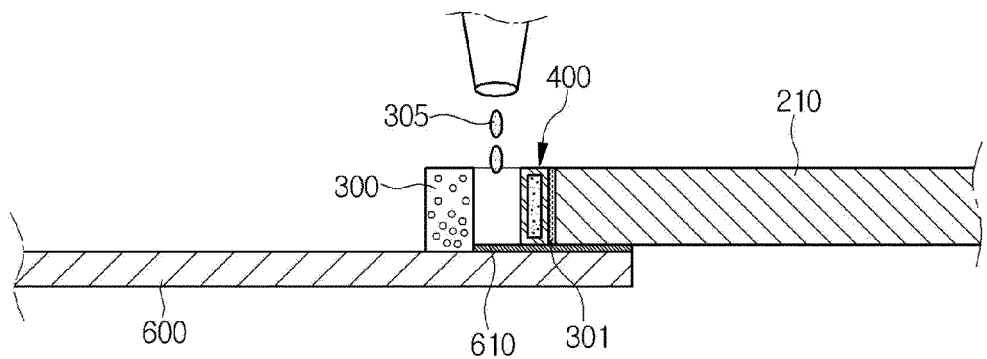
FIGS. 6 and 7 are sectional views showing a procedure of forming an adhering member according to the second embodiment.
Figure 7:
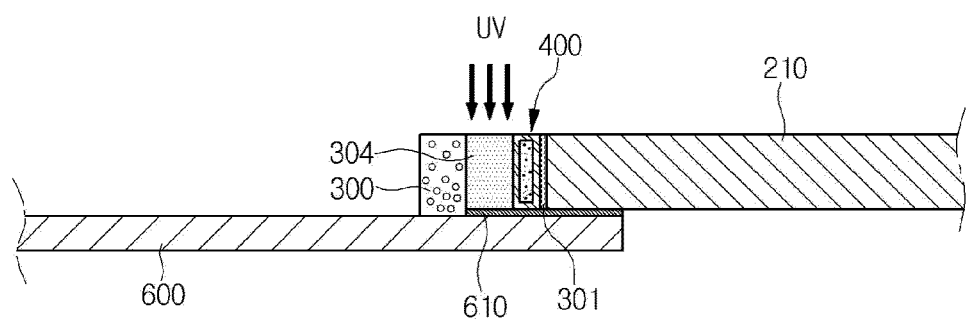

FIG. 5 is a sectional view showing a light emitting diode, an adhering member, a light conversion member, and a light guide plate according to a second embodiment. FIGS. 6 and 7 are sectional views showing the procedure of forming the adhering member according to the second embodiment. Hereinafter, the present embodiment will be described by making reference to the description of the liquid crystal display according to the previous embodiment, and a fourth adhering member will be further described. In other words, the description of the previous embodiment will be incorporated in the description of the present embodiment except for the modification.

Referring to FIGS. 5 to 7, a fourth adhering member 304 is interposed between the light emitting diodes 300 and the light conversion member 400.

The fourth adhering member 304 adheres to the light emitting diodes 300 and the light conversion member 400. In addition, the fourth adhering member 304 spaces the light emitting diodes 300 apart from the light conversion member 400. A width W4 of the fourth adhering member 304 is greater than a width W1 of the first adhering member 301.

For example, the width W4 of the fourth adhering member 304 may be in the range of about 200 µm to about 2.5 mm. In detail, the width W4 of the fourth adhering member 304 may be in the range of about 600 µm to about 2.5 mm.

Therefore, the fourth adhering member 304 allows the light emitting diodes 300 to closely make contact with the light conversion member 400 while spacing the light emitting diodes 300 apart from the light conversion member 400 by a sufficient interval.

Referring to FIGS. 6 and 7, the fourth adhering member 304 may be formed through the following scheme.

The light emitting diodes 300 are spaced apart from the light conversion member 400 by a desirable interval. In this case, the interval between the light emitting diodes 300 and the light conversion member 400 may be in the range of about 200 µm to about 2.5 mm. In detail, the interval between the light emitting diodes 300 and the light conversion member 400 may be in the range of about 600 µm to about 2.5 mm.

Thereafter, as shown in FIG. 6, a photocurable resin composition 305 is injected between the light emitting diodes 300 and the light conversion member 400. The photocurable resin composition 305 may include epoxy resin.

Thereafter, as shown in FIG. 7, a UV light is irradiated onto the photocurable resin composition 305, and the photocurable resin composition 305 is cured to form the fourth adhering member 304.

As described above, the interval between the light emitting diode 300 and the light conversion member 400 is increased by a desirable value through the fourth adhering member 304. Accordingly, the liquid crystal display according to the embodiment can represent improved life span and improved durability.

In addition, according to the liquid crystal display of the present embodiment, the interval between the light emitting diodes 300 and the light conversion member 400 can be increased without an additional member such as a spacer.

Figure 8:
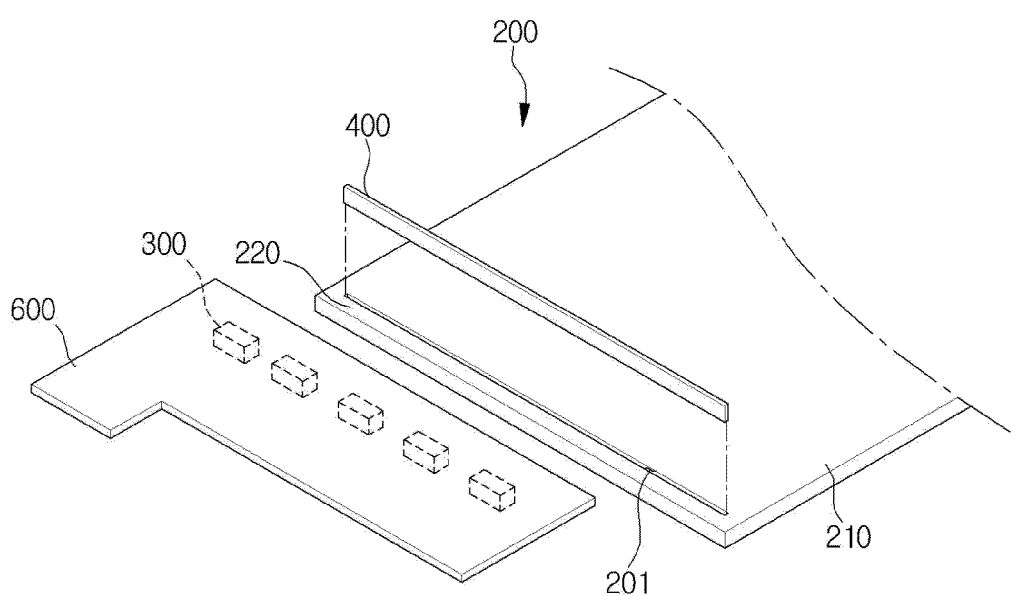
FIG. 8 is a view showing a light emitting diode, a light conversion member, and a light guide plate according to a third embodiment.
Figure 9:
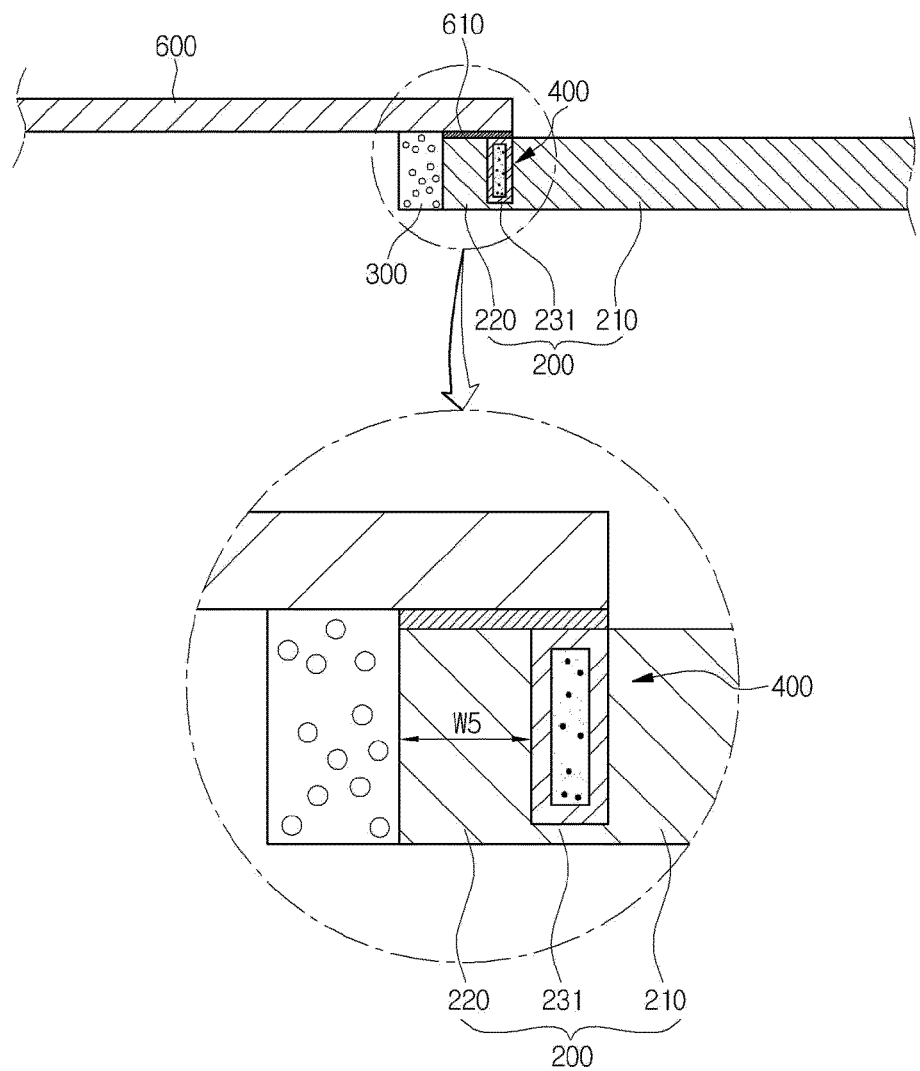
FIG. 9 is a sectional view showing the light emitting diode, the light conversion member, and the light guide plate according to the third embodiment.

FIG. 8 is a sectional view showing a light emitting diode, a light conversion member, and a light guide plate according to a third embodiment. FIG. 9 is a sectional view showing the light emitting diode, the light conversion member, and the light guide plate according to the third embodiment. Hereinafter, the present embodiment will be described by making reference to the description of the liquid crystal display according to the previous embodiment, and a light guide plate will be additionally described. In other words, the description of the previous embodiment will be incorporated in the description of the present embodiments except for a modification.

Referring to FIGS. 8 and 9, a groove 201 is formed in a light guide plate 200. The groove 201 may be formed in a top surface of the light guide plate 200. The groove 201 has a shape corresponding to a shape of the light conversion member 400.

In other words, the depth of the groove 201 may correspond to the height of the light conversion member 400. In addition, the width of the groove 201 may correspond to the width of the light conversion member 400. In addition, the depth of the groove 201 may be greater than the height of the light conversion member 400, and the width of the groove 201 may be greater than the width of the light conversion member 400.

In addition, the light guide plate 200 may include the light guide part 210, the spacer 220, and a first support part 231.

The light guide part 210 guides the light passing through the light conversion member 400 among the lights converted by the light conversion member 400 to emit the light upward. In other words, the light guide part 210 reflects, refracts, and scatters the incident light to output the light upward through the top surface thereof.

In addition, a part of the inner lateral sides of the groove serves as an incident surface of the light guide part 210.

The spacer 220 is interposed between the light emitting diodes 300 and the light conversion member 400. The spacer 220 spaces the light emitting diodes 300 apart from the light conversion member 400.

In other words, an interval between the light emitting diodes 300 and the light conversion member 400 may be greater than a width W5 of the spacer 220. For example, the width W5 of the spacer 220 may be in the range of about 200 µm to about 2.5 mm. In detail, the width W5 of the spacer 220 may be in the range of about 600 µm to about 2.5 mm. In more detail, the width W5 of the spacer 220 may be in the range of about 1 mm to about 2.5 mm.

The first support part 231 extends from the spacer 220 to the light guide part 210. The first support part 231 is provided under the light conversion member 400. In addition, the first support part 231 supports the light conversion member 400.

The first support part 231 constitutes the bottom surface of the groove 201. The light guide part 210, the spacer 220, and the first support part 231 are integrally formed. In other words, the light guide part 210, the spacer 220, and the first support part 231 may include the same material.

The light conversion member 400 is provided inside the groove 201. In other words, the light conversion member 400 is inserted into the groove 201.

In addition, the fifth adhering member may be filled in the groove 201. In other words, the fifth adhering member may include a filling member fully filled in the groove 201.

For example, the fifth adhering member may be interposed between the light conversion member 400 and the inner lateral side of the groove 201. In addition, the fifth adhering member closely makes contact with the light conversion member 400 and the inner lateral side of the groove 201.

In order to form the fifth adhering member, after inserting the light conversion member 400 into the groove 201, the photocurable resin composition may be injected into the groove 201. Thereafter, the resin composition injected into the groove 201 is cured by the UV light to form the fifth adhering member.

Since the light conversion member 400 is inserted into the groove 201, the liquid crystal display according to the embodiment can be easily manufactured. Especially, according to the liquid crystal display of the present embodiment, a process of attaching the light conversion member and the spacer to the light guide plate 200 is not required.

Therefore, the liquid crystal display according to the present embodiment can be manufactured through a simple process with the improved life span and the improved durability.

Figure 10:
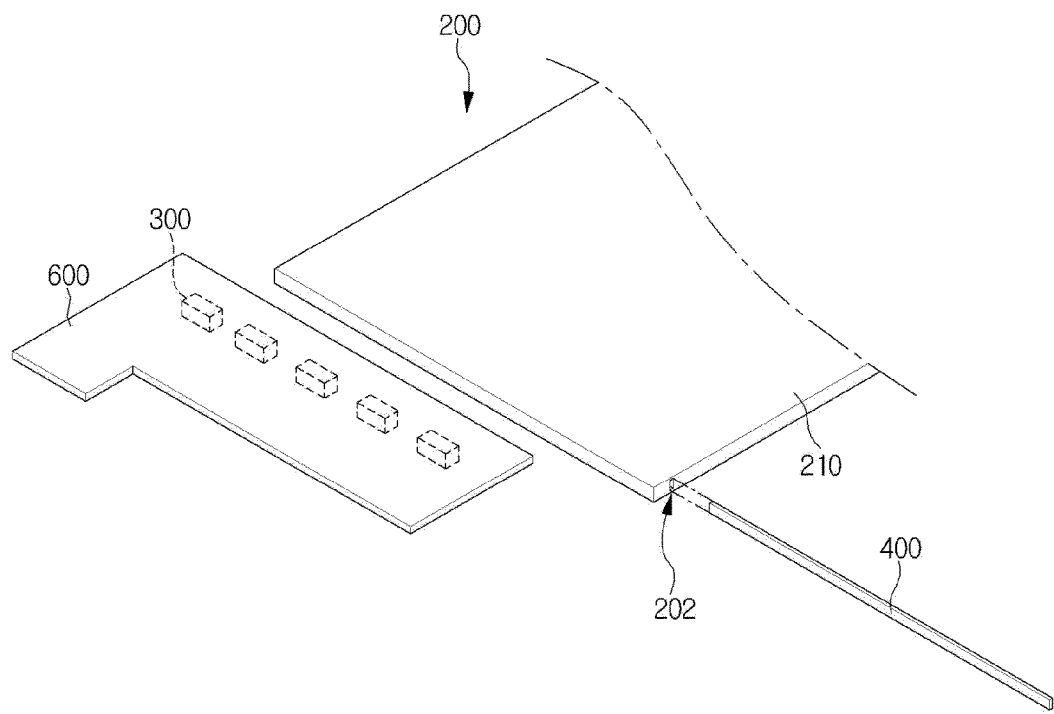
FIG. 10 is a view showing a light emitting diode, a light conversion member, and a light guide plate according to a fourth embodiment.
Figure 11:
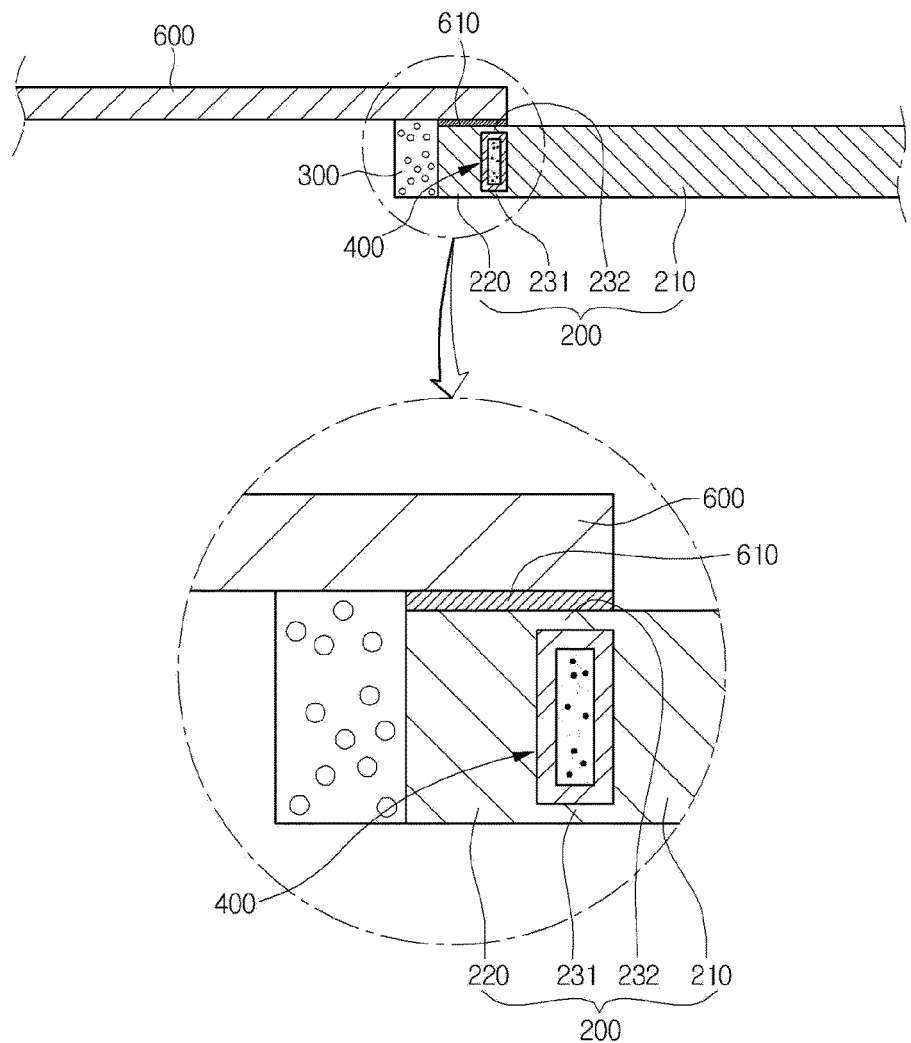
FIG. 11 is a sectional view showing the light emitting diode, the light conversion member, and the light guide plate according to the fourth embodiment.

FIG. 10 is a view showing a light emitting diode, a light conversion member, and a light guide plate according to a fourth embodiment. FIG. 11 is a sectional view showing the light emitting diode, the light conversion member, and the light guide plate according to the fourth embodiment. Hereinafter, the present embodiment will be described by making reference to the description of the liquid crystal display according to the previous embodiment, and a light guide plate will be further described. In other words, the description of the previous embodiments will be incorporated in the description of the present embodiment except for the modification.

Referring to FIGS. 10 and 11, a groove 202 is formed in the lateral side of the light guide plate 200. The groove 202 extends along the incident surface of the light guide plate 200.

Therefore, the light guide plate 200 includes a light guide part 210, the spacer 220, and first and second support parts 231 and 232.

The second support part 232 extends from the spacer 220 to the light guide part 210. The second support part 232 is provided on the light conversion member 400. In addition, the second support part 232 faces the first support part 231 while interposing the light conversion member 400 therebetween. In other words, the light conversion member 400 is sandwiched between the first and second support parts 231 and 232.

The spacer 220, the light guide part 210, and the first and second support parts 231 and 232 surround the light conversion member 400. The light conversion member 400 may be firmly fixed into the inner part of the light guide plate 200. In other words, the light conversion member 400 is fixed into the light guide plate 200 by the second support part 232 so that the light conversion member 400 is not separated from the light guide plate 200.

Therefore, in order to fix the light conversion member 400 into the light guide plate 200, an adhesive such as the adhering member is not required. Nevertheless, the photocurable resin composition may be injected into the groove and cured to form an adhering member.

Accordingly, the liquid crystal display according to the present embodiment may be manufactured through a simple process with the improved life span and the improved durability.

Figure 12:
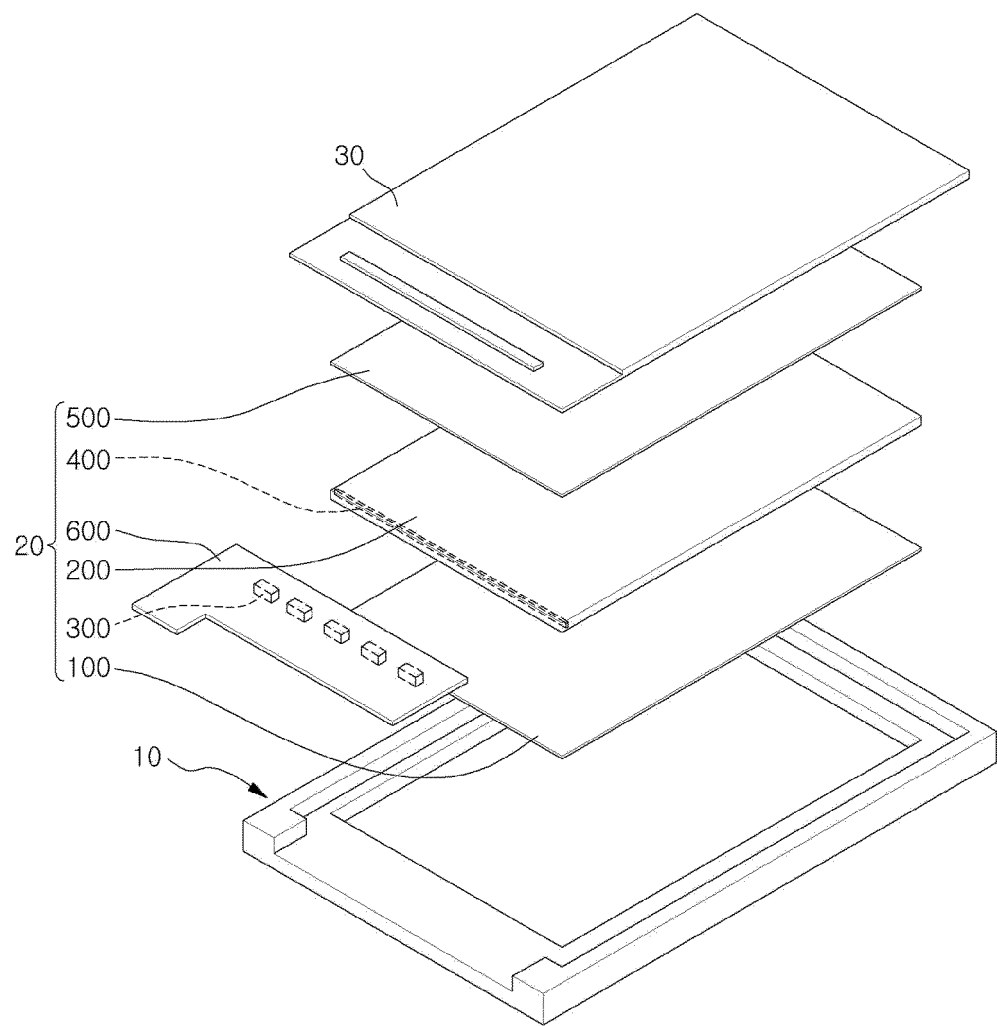
FIG. 12 is an exploded perspective view showing a liquid display device according to a fifth embodiment.
Figure 13:
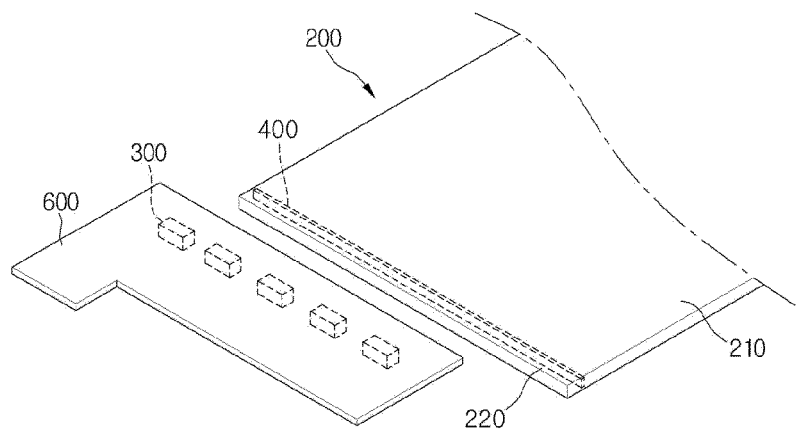
FIG. 13 is a view showing a light emitting diode, a light conversion member, and a light guide plate according to the fifth embodiment.
Figure 14:
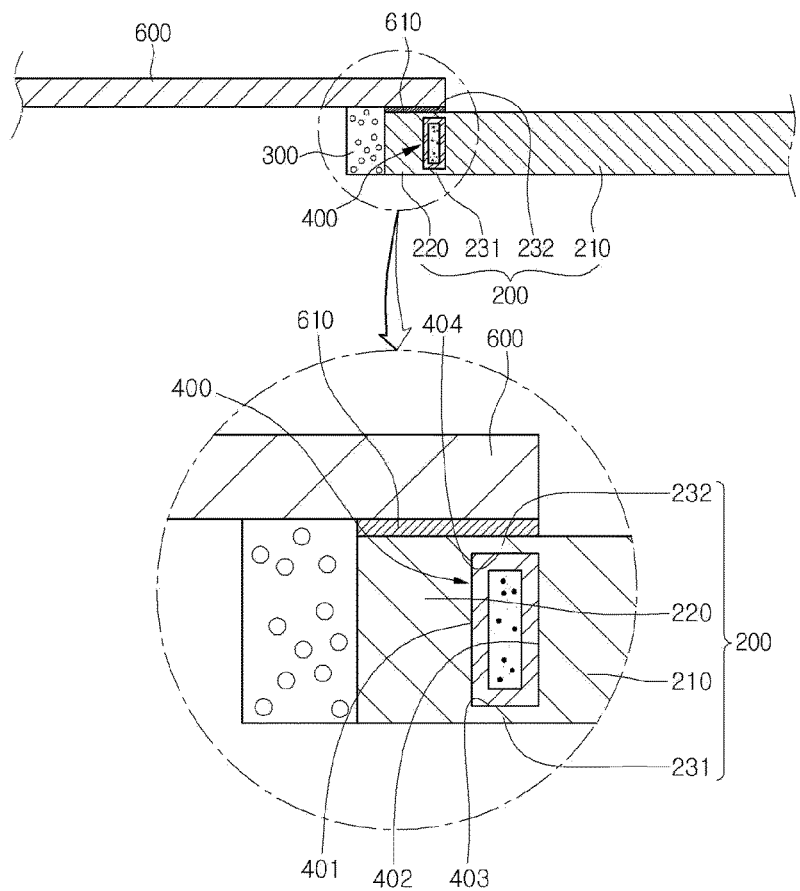
FIG. 14 is a view showing the light emitting diode, the light conversion member, and the light guide plate according to the fifth embodiment.
Figure 15:
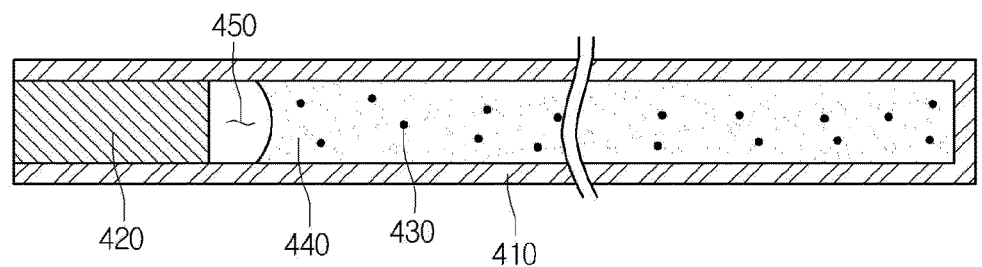
FIG. 15 is a sectional view showing the light conversion member according to the fifth embodiment.
Figure 16:
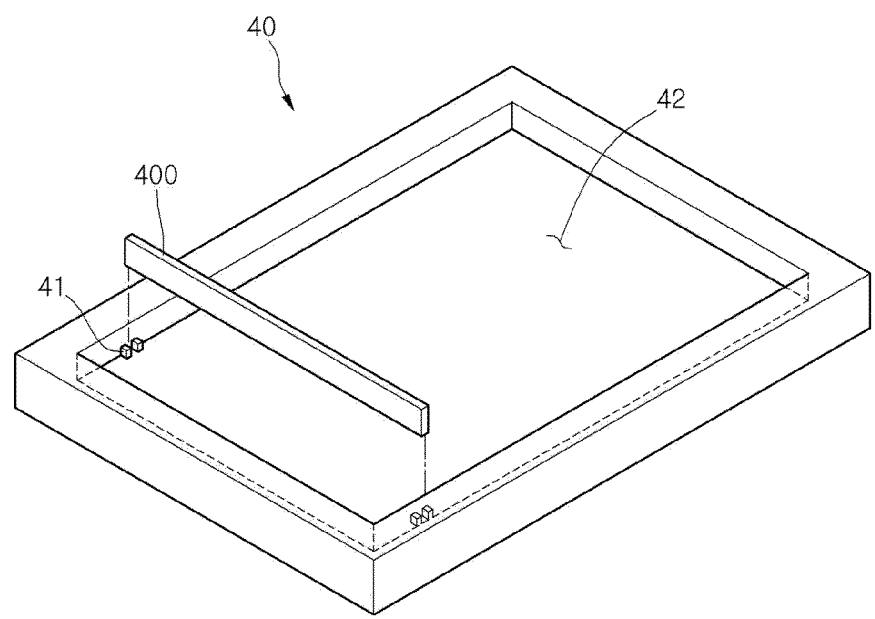
FIGS. 16 and 17 are sectional views showing the manufacturing process of the light guide plate according to the fifth embodiment.
Figure 17:
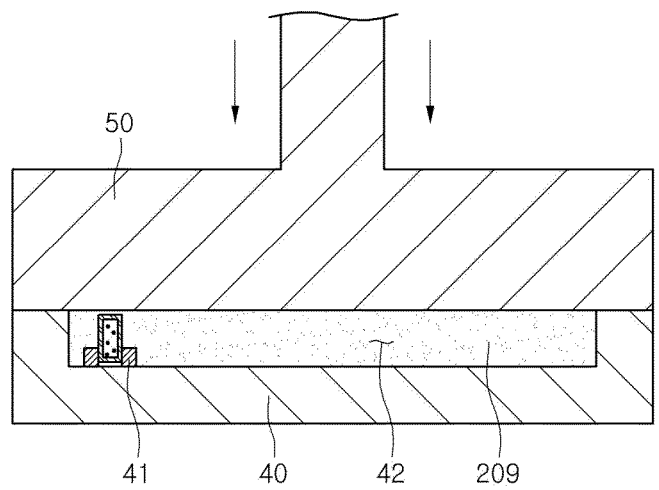
Figure 18:
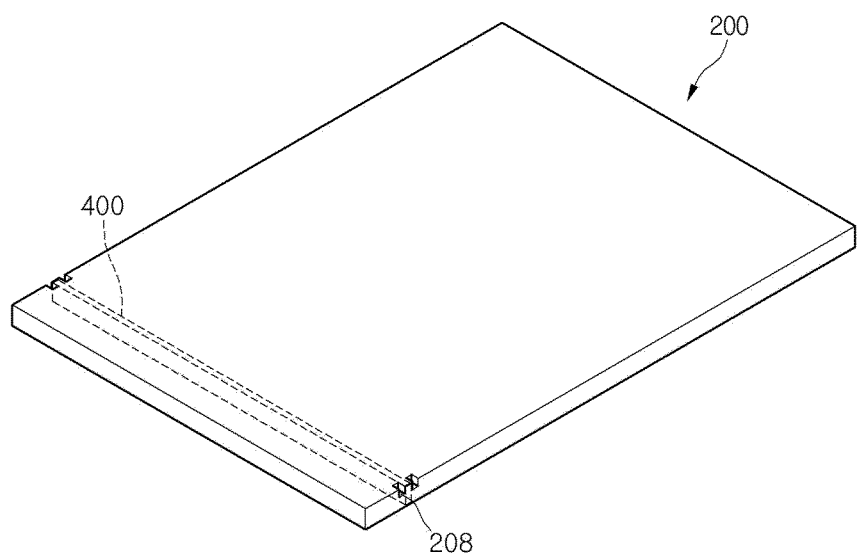
FIG. 18 is a perspective view showing a bottom surface of the light guide plate according to the fifth embodiment.

FIG. 12 is an exploded perspective view showing a liquid display device according to a fifth embodiment, and FIG. 13 is a view showing the light emitting diode, the light conversion member, and the light guide plate according to the fifth embodiment. FIG. 14 is a view showing the light emitting diode, the light conversion member, and the light guide plate according to the fifth embodiment, and FIG. 15 is a sectional view showing the light conversion member according to the fifth embodiment. FIGS. 16 and 17 are sectional views showing the manufacturing process of the light guide plate according to the fifth embodiment, and FIG. 18 is a perspective view showing a bottom surface of the light guide plate according to the fifth embodiment. Hereinafter, the present embodiment will be described by making reference to the description of the liquid crystal display according to the previous embodiment, and a light guide plate will be further described. In other words, the description of the previous embodiments will be incorporated in the description of the present embodiment except for the modification.

Referring to FIGS. 12 to 18, the liquid crystal display according to the embodiment includes the mold frame 10, the backlight assembly 20, and the liquid crystal panel 30.

The light guide plate 200 is provided on the reflective sheet 100. The light guide plate 200 receives the light emitted from the light emitting diode 300 to output the light upward through reflection, refraction, and scattering. The light guide plate 200 serves as a light guide member to guide the light emitted from the light emitting diode 300.

The light guide plate 200 includes an incident surface facing the light emitting diode 300. In addition, a lateral side of the light guide plate 200 facing the light emitting diode 300 serves as the incident surface.

As shown in FIG. 13, the light guide plate 200 receives the light conversion member 400. In detail, the light guide plate 200 may surround the light conversion member 400. The light guide plate 200 may surround the whole outer surface of the light conversion member 400. The light guide plate 200 may cover both ends of the light conversion member 400. The light guide plate 200 may cover all of an incident surface 401, an exit surface 402, a top surface 404, and a bottom surface 403 of the light conversion member 400.

In addition, the light guide plate 200 may directly adhere to the light conversion member 400. In detail, the light guide plate 200 may directly adhere to at least one surface of the light conversion member 400. In detail, the light guide plate 200 may close make contact with the incident surface 401, the exit surface 402, the bottom surface 403, and the top surface 404 of the light conversion member 400. In this case, the incident surface 401 of the light conversion member 400 is provided in opposition to the light emitting diode 300. In addition, the incident surface 401 of the light conversion member 400 is provided in opposition to the exit surface 402 of the light conversion member 400.

In other words, the light guide plate 200 may be integrally formed with the light conversion member 400.

As shown in FIG. 14, the light guide plate 200 includes the light guide part 210, a light incident part 220, and the first and second support parts 231 and 232.

The light guide part 210 guides the light converted by the light conversion member 400 and the light passing through the light conversion member 400 to emit the light upward. In other words, the light guide part 210 reflects, refracts, and scatters the incident light to output the light upward through the top surface thereof.

In addition, the light guide part 210 adheres to the exit surface 402 of the light conversion member 400. In detail, the light guide part 210 directly adheres to the exit surface 402 of the light conversion member 400. In other words, an air layer does not exist between the light guide part 210 and the light conversion member 400.

The light incident part 220 is interposed between the light emitting diode 300 and the light conversion member 400. The light incident part 220 receives a light emitted from the light emitting diode 300. The light incident part 220 adheres to the incident surface 401 of the light conversion member 400. In detail, the incident part 220 directly adheres to the incident surface 401 of the light conversion member 400. In other words, the air layer does not exist between the light incident part 220 and the light conversion member 400.

The light incident part 220 spaces the light emitting diode 300 apart from the light conversion member 400. In other words, the light incident part 220 serves as a spacer to increase the interval between the light emitting diode 300 and the light conversion member 400.

In other words, the interval between the light emitting diodes 300 and the light conversion member 400 may be greater than the width of the light incident part 220. For example, the width of the light incident part 220 may be in the range of about 200 μm to about 2.5 mm. In more detail, the width of the light incident part 220 may be in the range of about 600 μm to about 2.5 mm.

The first support part 231 extends from the light incident part 220 to the light guide part 210. The first support part 231 is provided under the light conversion member 400. In addition, the first support part 231 supports the light conversion member 400.

In addition, the first support part 231 may adhere to a bottom surface 403 of the light conversion member 400.

The second support part 232 extends from the light incident part 220 to the light guide part 210. The second support part 232 is provided on the light conversion member 400. In addition, the second support part 232 faces the first support part 231 while interposing the light conversion member 400 therebetween. In other words, the light conversion member 400 is sandwiched between the first and second support parts 231 and 232.

The second support part 232 may adhere to a top surface 404 of the light conversion member 400.

The light incident part 220, the light guide part 210, and the first and second support parts 231 and 232 surround the light conversion member 400. Therefore, the light conversion member 400 may be firmly fixed into the inner part of the light guide plate 200. In other words, the light conversion member 400 is fixed into the light guide plate 200 by the second support part 232 so that the light conversion member 400 is not separated from the light guide plate 200.

As shown in FIGS. 13 and 14, the light conversion member 400 is provided in the light guide plate 200. The light conversion member 400 may be integrally formed with the light guide plate 200. The light conversion member 400 and the light guide plate 200 are integrally formed with each other to constitute a light conversion guide member to change the wavelength and the path of the incident light.

In other words, the light conversion guide member is one optical member. The light conversion guide member converts the wavelength of the light emitted from the light emitting diode 300 and changes the light into the surface light to be output upward.

In addition, the light emitting diode 300 may be attached to the light incident part 220. In this case, the adhering member 303 may be interposed between the light emitting diode 300 and the light incident part 220. The adhering member 303 may adhere to the light emitting diode 300 and the light incident part 220.

Referring to FIGS. 16 and 17, the light conversion member 400 may be inserted into the light guide plate 200 through the following process. The light guide plate 200 may be formed through a dual injection process.

As shown in FIG. 16, the light conversion member 400 is provided in a first mold 40. The first mold 40 may include a molding groove 42 having the shape corresponding to the shape of the light guide plate 200.

In addition, the first mold 40 may include fixing protrusions 41 to fix the light conversion member 400. The fixing protrusions 41 may support the lateral sides of the light conversion member 400. In other words, the light conversion member 400 is fixedly inserted between the fixing protrusions 41.

Referring to FIG. 17, a material 209 is injected into the molding groove 42 in order to form the light guide plate 200. The material 209 is fully filled in the molding groove 42 while surrounding the light conversion member 400. In other words, the material 209 may be injected into the molding groove 42 in such a manner that the material 209 adheres to the whole outer surface of the light conversion member 400.

Next, a second mold 50 presses the material 209 filled in the molding groove 42, and the resultant structures is subject to a cooling process. Thereafter, the light guide plate 200 may be formed.

In addition, the light guide plate 200 may be formed through a photo curing process and/or a thermal curing process. In other words, the material 209 may include a photo-curable material and/or a thermal curable material. In this case, the material filled in the molding groove 42 is cured by a light and/or a heat to form the light guide plate 200.

As shown in FIG. 18, grooves 208 may be formed in the light guide plate 200 by the fixing protrusions 41. In other words, the grooves 208 correspond to the fixing protrusions 41. The grooves 208 may be formed in the bottom surface of the light guide plate 200.

The light conversion member 400 is inserted into the light guide plate 200. Therefore, the light guide plate 200 and the light conversion member 400 may be integrally formed with each other. Accordingly, the light conversion member 400 and the light guide plate 200 may be simply assembled in order to manufacture the liquid crystal display according to the embodiment.

In addition, the light conversion member 400 may directly adhere to the light guide plate 200. Therefore, light loss between the light conversion member 400 and the light guide plate 200 can be minimized. Therefore, the liquid crystal display according to the embodiment can represent improved brightness and improved color representation.

In addition, since the light conversion member 400 is provided in the light guide plate 200, the light conversion member 400 can be effectively protected by the light guide plate 200. In particular, the light conversion member 400 can be effectively protected from external physical impact and external chemical impact by the light guide plate 200. In particular, the light conversion particles 410 can be effectively protected from oxygen and/or moisture by the light guide plate 200.

Therefore, the liquid crystal display according to the embodiment can represent improved reliability and improved durability.

In addition, as described above, the light emitting diode 300 is spaced apart from the light conversion member 400 by the light incident part 220. Accordingly, the light emitting diode 300 is sufficiently spaced apart from the light conversion member 400, so that the light emitted from the light emitting diode 300 can be incident into the light conversion member 400 in the sufficiently diffused state.

Therefore, the liquid crystal display according to the embodiment can inhibit the light emitted from the light emitting diode 300 from being intensively into a part of the light conversion member 400. Therefore, since the liquid crystal display according to the embodiment allows the light to be uniformly incident into the light conversion member 400, the denaturalization of the light conversion particles caused by the intensively incident light can be inhibited.

In other words, according to the liquid crystal display of the embodiment, a light is intensively irradiated onto a part of the light conversion particles, thereby inhibiting the denaturalization of the part of the light conversion particles.

Therefore, the display device according to the embodiment can represent improved life span and improved durability.

Figure 19:
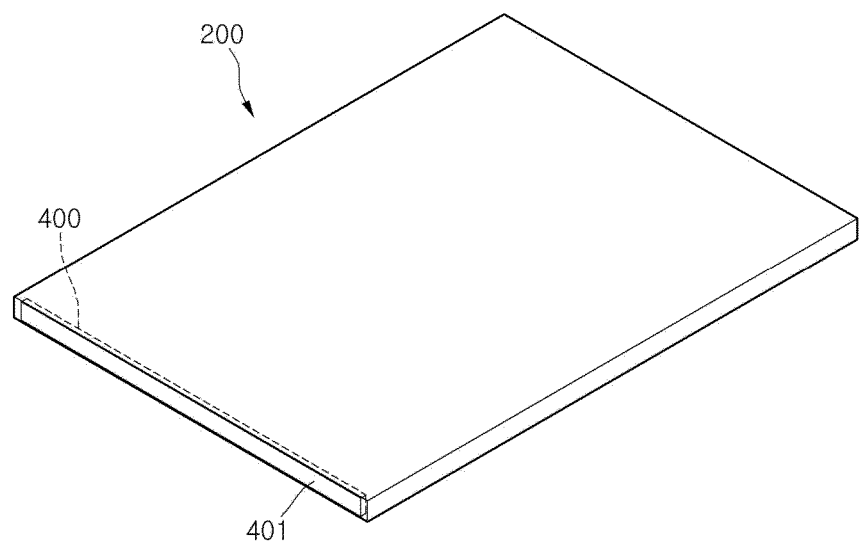
FIG. 19 is a perspective view showing a light conversion member and a light guide plate according to a sixth embodiment.
Figure 20:
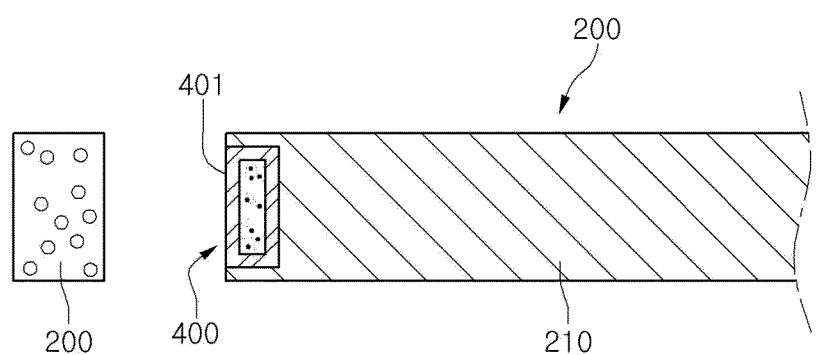
FIG. 20 is a sectional view showing the light emitting diode, the light conversion member, and the light guide plate according to the sixth embodiment.
Figure 21:
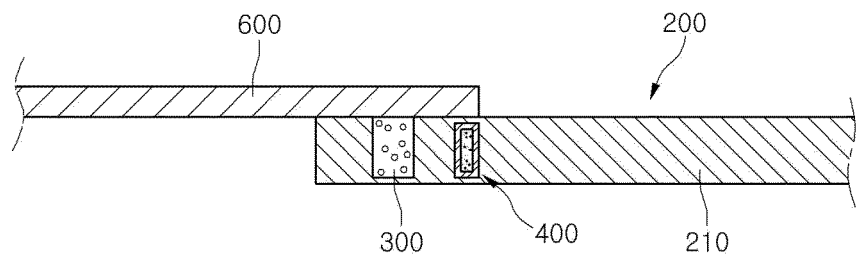
FIG. 21 is a sectional view showing a light emitting diode, a light guide plate, and a light conversion member according to a seventh embodiment.

FIG. 19 is a perspective view showing a light conversion member and a light guide plate according to a sixth embodiment, and FIG. 20 is a sectional view showing the light emitting diode, the light conversion member, and the light guide plate according to the sixth embodiment. FIG. 21 is a sectional view showing a light emitting diode, a light guide plate, and a light conversion member according to a seventh embodiment. Hereinafter, the present embodiment will be described by making reference to the description of the liquid crystal display according to the previous embodiment, and a light guide plate will be additionally described. In other words, the description of the previous embodiment will be incorporated in the description of the present embodiments except for a modification.

Referring to FIGS. 19 and 20, a part of the light conversion member 400 may be exposed out of the light guide plate 200. In detail, the incident surface 401 of the light conversion member 400 may be exposed out of the light guide plate 200.

The incident surface 401 of the light conversion member 400 is provided in opposition to the light emitting diode 300. In other words, the incident surface of the light conversion member 400 faces the light emitting diode 300.

Accordingly, the light emitted from the light emitting diode 300 can be directly incident onto the light conversion member 400.

Therefore, the liquid crystal display according to the present embodiment can reduce light loss and represent more improved brightness.

Referring to FIG. 21, the light emitting diode 300 may be inserted into the light guide plate 200. In other words, the light guide plate 200 may adhere to the light emitting diode 300 and the light conversion member 400. The light emitting diode 300 and the light conversion member 400 are integrally formed with the light guide plate 200.

Therefore, the light emitted from the light emitting diode 300 is directly incident onto the light incident part 220. Accordingly, the liquid crystal display according to the present embodiment can reduce light loss and represent more improved brightness.

In addition, since the light emitting diode 300, the light conversion member 400, and the light guide plate 200 are integrally formed with each other, the liquid crystal display according to the embodiment can be easily assembled.

Figure 22:
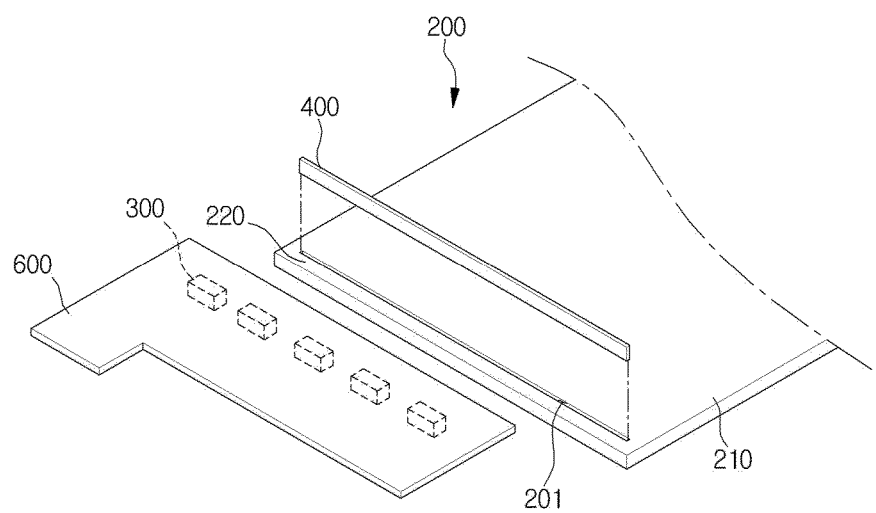
FIG. 22 is a perspective view showing a light emitting diode, a light guide plate, and a light conversion member according to an eighth embodiment.
Figure 23:
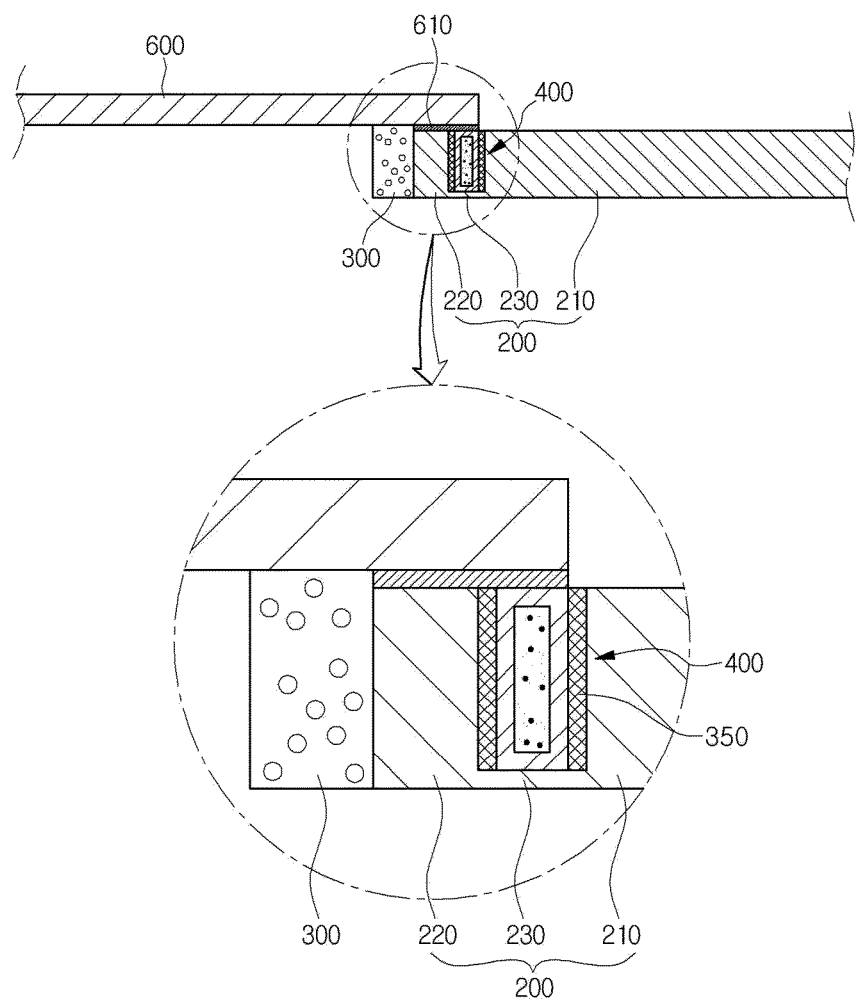
FIG. 23 is a sectional view showing the light emitting diode, the light guide plate, and the light conversion member according to the eighth embodiment.

FIG. 22 is a perspective view showing a light emitting diode, a light guide plate, and a light conversion member according to an eighth embodiment, and FIG. 23 is a sectional view showing the light emitting diode, the light guide plate, and the light conversion member according to the eighth embodiment. Hereinafter, the present embodiment will be described by making reference to the description of the liquid crystal display according to the previous embodiment, and a light guide plate will be further described. In other words, the description of the previous embodiments will be incorporated in the description of the present embodiment except for the modification.

Referring to FIGS. 22 and 23, the groove 201 is formed in the light guide plate 200. The groove 201 may be formed in the top surface of the light guide plate 200. The groove 201 has a shape corresponding to a shape of the light conversion member 400.

In other words, the depth of the groove 201 may correspond to the height of the light conversion member 400. In addition, the width of the groove 201 may correspond to the width of the light conversion member 400. In addition, the depth of the groove 201 may be greater than the height of the light conversion member 400, and the width of the groove 201 may be greater than the width of the light conversion member 400.

In addition, the light guide plate 200 may include the light guide part 210, the light incident part 220, and the first support part 231.

The light guide part 210 guides the light converted by the light conversion member 400 and the light passing through the light conversion member 400 to emit the light upward. In other words, the light guide part 210 reflects, refracts, and scatters the incident light to output the light upward through the top surface thereof.

In addition, a part of the inner lateral sides of the groove 201 serves as a incident surface of the light guide part 210.

The light incident part 220 is interposed between the light emitting diode 300 and the light conversion member 400. The light incident part 220 spaces the light emitting diode 300 apart from the light conversion member 400.

In other words, the interval between the light emitting diode 300 and the light conversion member 400 may be greater than the width of the light incident part 220. For example, the width of the light incident part 220 may be in the range of about 200 μgm to about 2.5 mm. In more particular, the width of the light incident part 220 may be in the range of about 600 μm to about 2.5 mm.

The first support part 231 extends from the light incident part 220 to the light guide part 210. The first support part 231 is provided under the light conversion member 400. In addition, the first support part 231 supports the light conversion member 400.

The first support part 231 constitutes the bottom surface of the groove 201. The light guide part 210, the spacer 220, and the first support part 231 are integrally formed with each other. In other words, the light guide part 210, the spacer 220, and the first support part 231 may include the same material.

The light conversion member 400 is provided inside the groove 201. In other words, the light conversion member 400 is inserted into the groove 201.

In addition, the adhering member 350 may be filled in the groove 201. In other words, the adhering member 350 may include a filling member fully filled in the groove 201.

For example, the adhering member 350 may be interposed between the light conversion member 400 and the inner lateral side of the groove 201. In addition, the adhering member 350 may adhere to the light conversion member 400 and the inner lateral side of the groove 201.

In order to form the adhering member 350, after inserting the light conversion member 400 into the groove 201, the photocurable resin composition may be injected into the groove 201. Thereafter, the resin composition injected into the groove 201 is cured by the UV light to form the adhering member 350.

Since the light conversion member 400 is inserted into the groove 201, the liquid crystal display according to the embodiment can be easily manufactured.

Therefore, the liquid crystal display according to the present embodiment can be manufactured through a simple process with improved life span and improved durability.

Figure 24:
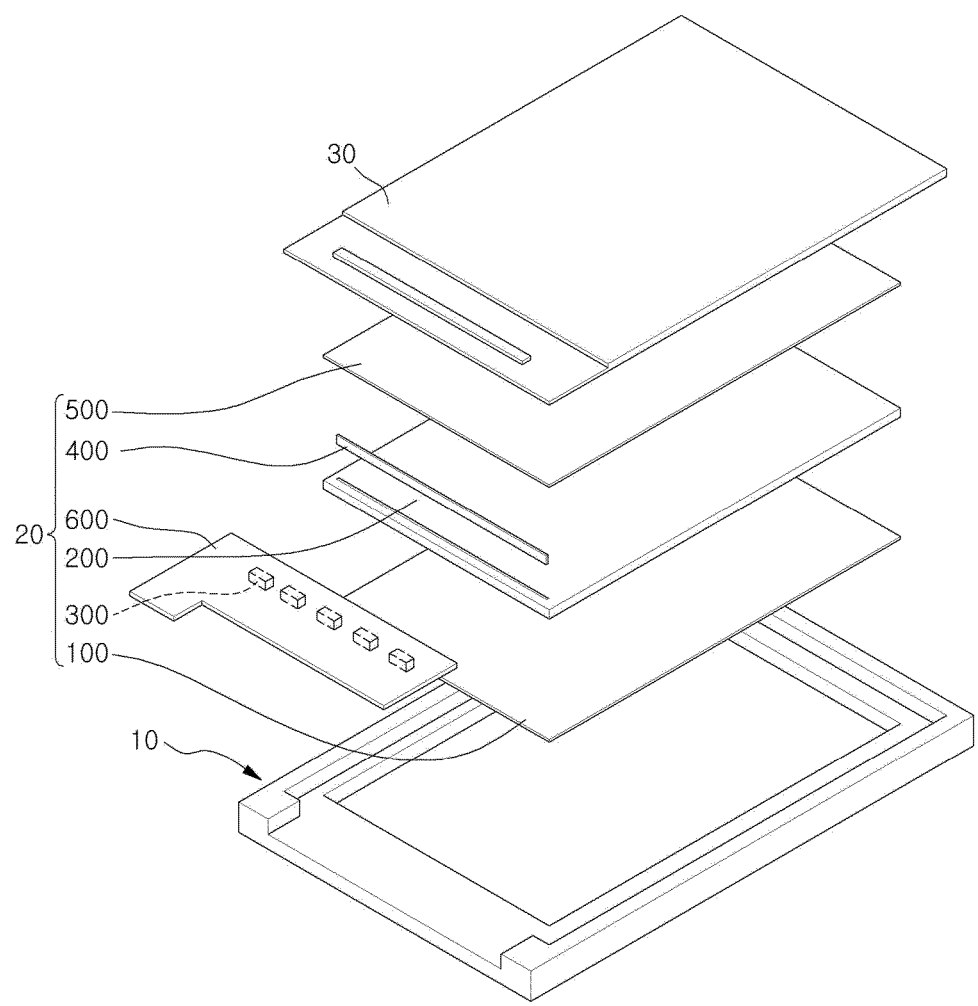
FIG. 24 is an exploded perspective view showing a liquid crystal display according to a ninth embodiment.
Figure 25:
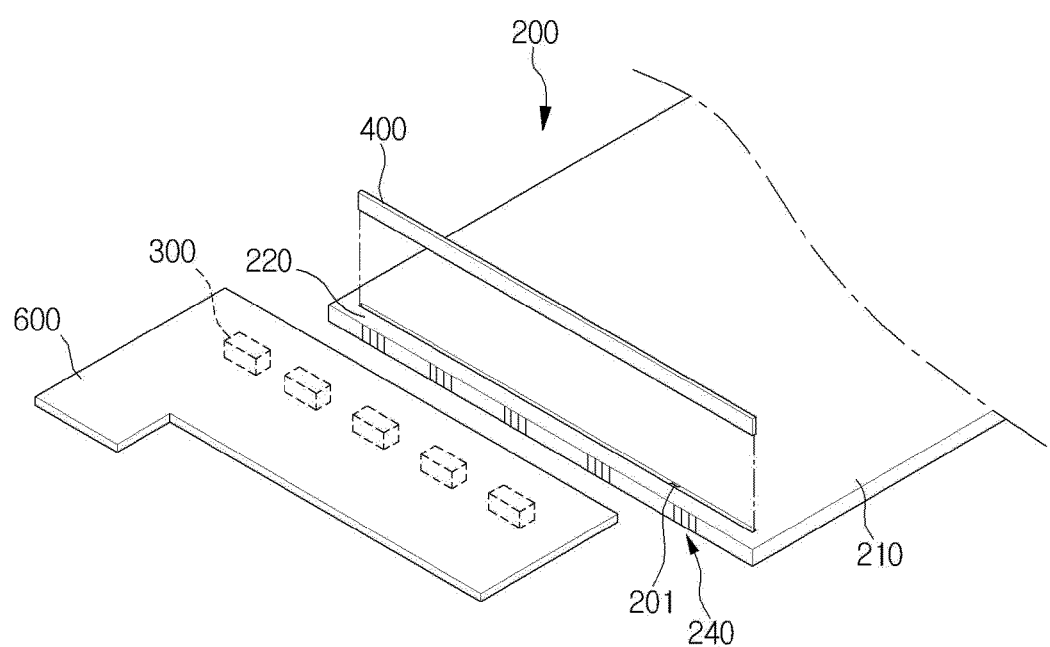
FIG. 25 is a perspective view showing light emitting diodes, a light guide plate, and a light conversion member according to the ninth embodiment.
Figure 26:
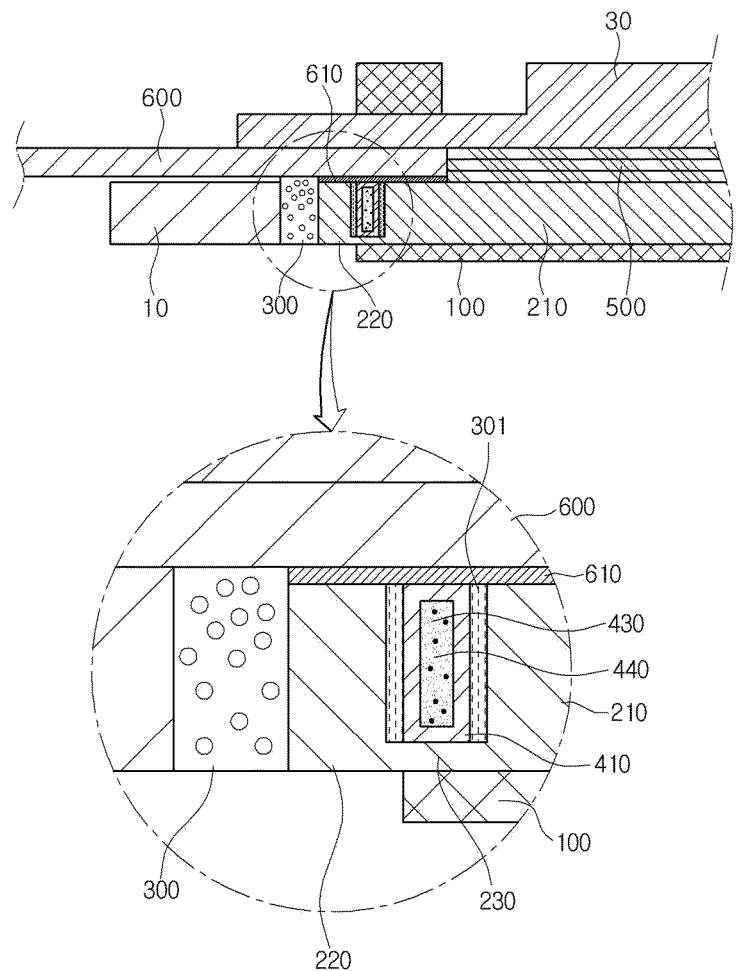
FIG. 26 is a sectional view showing the liquid crystal display according to the ninth embodiment.
Figure 27:
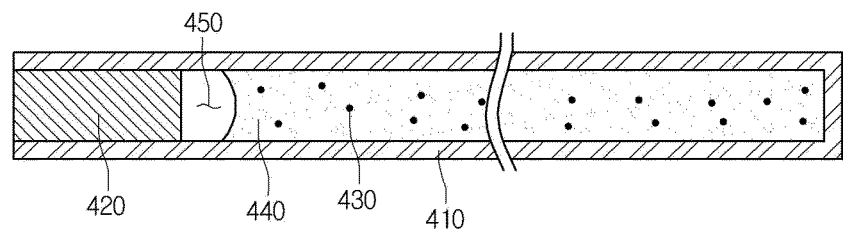
FIG. 27 is a sectional view showing the light conversion member according to the ninth embodiment.

FIG. 24 is an exploded perspective view showing a liquid crystal display according to a ninth embodiment, FIG. 25 is a perspective view showing light emitting diodes, a light guide plate, and a light conversion member according to the ninth embodiment, FIG. 26 is a sectional view showing the liquid crystal display according to the ninth embodiment, and FIG. 27 is a sectional view showing the light conversion member according to the ninth embodiment. Hereinafter, the present embodiment will be described by making reference to the description of the liquid crystal display according to the previous embodiment, and a light guide plate will be further described. In other words, the description of the previous embodiments will be incorporated in the description of the present embodiment except for the modification.

Referring to FIGS. 24 to 27, the liquid crystal display according to the embodiment includes the mold frame 10, the backlight assembly 20, and the liquid crystal panel 30.

The light guide plate 200 has an incident surface facing the light emitting diode 300. In other words, a lateral side of the light guide plate 200 facing the light emitting diode 300 serves as the incident surface.

The light guide plate 200 may be provided on the incident surface thereof with a lens pattern 240. The lens pattern 240 may have the shape of a Fresnel lens. In addition, the lens pattern 240 may include a protrusion pattern or a stripe pattern.

In addition, the light guide plate 200 is an optical member. In detail, the light guide plate 200 serves as a light guide plate.

Referring to FIGS. 25 and 26, the groove 201 is formed in the light guide plate 200. The groove 201 may be formed in the top surface of the light guide plate 200. The groove 201 has a shape corresponding to a shape of the light conversion member 400. The groove 201 may include the bottom surface to support the light conversion member 400. In addition, the groove 201 may be formed by perforating the entire portion of the light guide plate 200.

In other words, the depth of the groove 201 may correspond to the height of the light conversion member 400. In addition, the width of the groove 201 may correspond to the width of the light conversion member 400. In addition, the depth of the groove 201 may be greater than the height of the light conversion member 400, and the width of the groove 201 may be greater than the width of the light conversion member 400.

In addition, the light guide plate 200 may include the light guide part 210, the spacer 220, and the support part 230.

The light guide part 210 guides the light converted by the light conversion member 400 and the light passing through the light conversion member 400 to emit the light upward. In other words, the light guide part 210 reflects, refracts, and scatters the incident light to output the light upward through the top surface thereof.

In addition, a part of the inner lateral sides of the groove 201 serves as the incident surface of the light guide part 210.

The spacer 220 is provided between the light emitting diodes 300 and the light conversion member 400. The spacer 220 spaces the light emitting diodes 300 apart from the light conversion member 400.

In other words, the interval between the light emitting diodes 300 and the light conversion member 400 may be greater than the width of the spacer 220. For example, the width of the spacer 220 may be in the range of about 200 μm to about 2.5 mm. In more detail, the width of the spacer 220 may be in the range of about 600 μm to about 2.5 mm.

The support part 230 extends from the spacer 220 to the light guide part 210. The support part 230 is provided under the light conversion member 400. In addition, the support part 230 supports the light conversion member 400.

The support part 230 constitutes the bottom surface of the groove 201. The light guide part 210, the spacer 220, and the support part 230 are integrally formed with each other. In other words, the light guide part 210, the spacer 220, and the support part 230 may include the same material.

The light conversion member 400 is provided inside the groove 201. In other words, the light conversion member 400 is inserted into the groove 201.

In addition, the adhering member 301 may be filled in the groove 201. In other words, the adhering member 301 may include a filling member fully filled in the groove 201. For example, the adhering member 301 may be interposed between the light conversion member 400 and the inner lateral side of the groove 201. In addition, the adhering member 301 may adhere to the light conversion member 400 and the inner lateral side of the groove 201.

In order to form the adhering member 391, after inserting the light conversion member 400 into the groove 201, the photocurable resin composition may be injected into the groove 201. Thereafter, the resin composition injected into the groove 201 is cured by the UV light to form the adhering member 301.

The light conversion member 400 extends in one direction. In detail, the light emitting diodes 300 are arranged in line with each other in one direction. In this case, the light conversion member 400 may extend in a direction in which the light emitting diodes 300 are arranged in line with each other.

The light emitting diodes 300 are arranged at the lateral side of the light guide plate 200. In detail, the light emitting diodes 300 are provided at the incident surface. The light emitting diodes 300 serve as a light source to generate lights. In more detail, the light emitting diodes 300 emit lights toward the light conversion member 400.

The light conversion member 400 is provided inside the groove 201. In other words, the light conversion member 400 is inserted into the groove 201. In more detail, the light conversion member 400 is interposed between the spacer 220 and the light guide part 210.

As described above, since the light conversion member 400 is inserted into the light guide plate 200, the light emitting diodes 300 are spaced apart from the light conversion member 400. Accordingly, the light emitting diodes 300 are sufficiently spaced apart from the light conversion member 400, so that the lights emitted from the light emitting diodes 300 can be incident into the light conversion member 400 in the sufficiently diffused state.

Therefore, the liquid crystal display according to the embodiment can inhibit the light emitted from the light emitting diode 300 from being intensively into a part of the light conversion member 400. Therefore, since the liquid crystal display according to the embodiment allows the light to be uniformly incident into the light conversion member 400, the denaturalization of the light conversion particles caused by the intensively incident light can be inhibited.

In other words, the liquid crystal display according to the embodiment can inhibit a part of the light conversion particles from being degraded due to the intensive light irradiation onto the part of the light conversion particles.

In addition, the light conversion member 400 is spaced apart from the light emitting diodes 300, thereby inhibiting the light conversion particles from being degraded due to the heat emitted from the light emitting diodes 300.

Accordingly, the liquid crystal display according to the embodiment can represent improved life span and improved durability.

Figure 28:
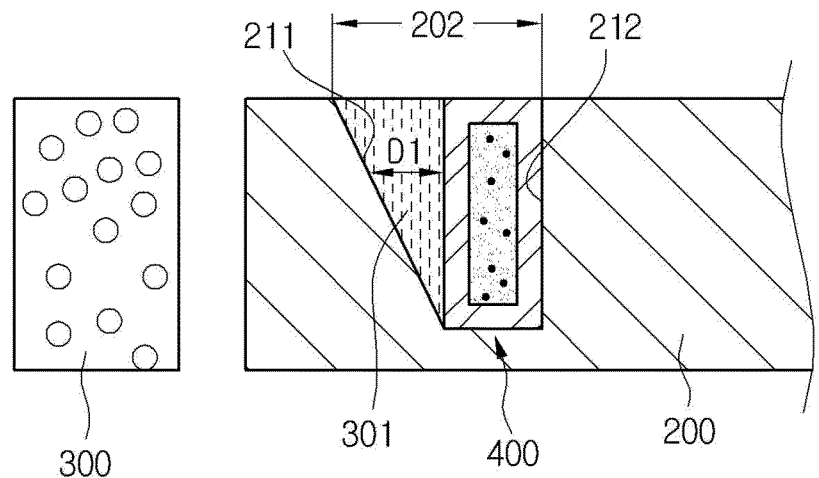
FIG. 28 is a sectional view showing a light emitting diode, a light guide plate, and a light conversion member according to a tenth embodiment.

FIG. 28 is a sectional view showing a light emitting diode, a light guide plate, and a light conversion member according to a tenth embodiment. Hereinafter, the present embodiment will be described by making reference to the description of the liquid crystal display according to the previous embodiment, and the shape of the groove will be further described. In other words, the description of the previous embodiments will be incorporated in the description of the present embodiment except for the modification.

Referring to FIG. 28, the groove 202 is formed in the top surface of the light guide plate 200. The groove 202 includes a first inner lateral side 211 inclined with respect to the light guide plate 200. In addition, the groove 202 includes a second inner lateral side 212 provided in opposition to the first inner lateral side 211. The second inner lateral side 212 may be perpendicular to the top surface of the light guide plate 200. In addition, the groove 202 may include a bottom surface extending from the first inner lateral surface 211 to the second inner lateral surface 212.

A distance D1 from the first inner lateral side 211 to the light conversion member 400 may be gradually decreased as the groove 201 becomes deeper. In other words, the width of the groove 201 may be gradually increased toward the entrance of the groove 202.

In addition, the adhering member 301 may be filled in the groove 202. In detail, the adhering member 301 may be filled between the first inner lateral side 211 and the light conversion member 400.

Since the first inner lateral side 211 is inclined with respect to the top surface of the light guide plate 200, the groove 202 may have a wide entrance. Therefore, the light conversion member 400 may be easily inserted into the groove 202.

In other words, the second inner lateral side 212 is a base to determine the position of the light conversion member 400. That is, after inserting the light conversion member 400 into the groove 202, a worker directly brings the light conversion member 400 into contact with the second inner lateral side 212. Thereafter, resin composition is filled in the groove 202 to form the adhering member 301 and cured, so that the light conversion member 400 can be fixed into the groove 202.

Therefore, the light conversion member 400 can be fixed to the exact position in the groove 202. Therefore, the liquid crystal display according to the embodiment can be easily manufactured and represent an improved optical characteristic.

Figure 29:
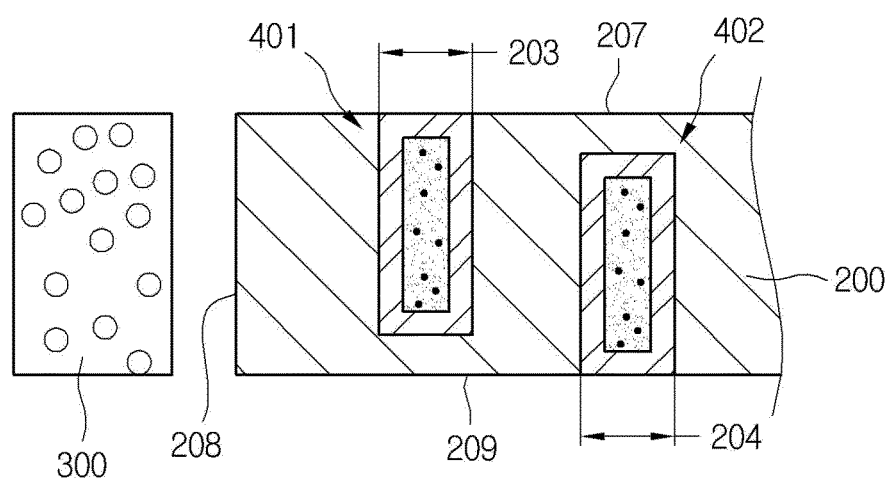
FIG. 29 is a sectional view showing a light emitting diode, a light guide plate, and first and second light conversion members according to an eleventh embodiment.

FIG. 29 is a sectional view showing a light emitting diode, a light guide plate, and first and second light conversion members according to an eleventh embodiment. Hereinafter, the present embodiment will be described by making reference to the description of the liquid crystal display according to the previous embodiment, and the first and second light conversion members will be further described. In other words, the description of the previous embodiments will be incorporated in the description of the present embodiment except for the modification.

Referring to FIG. 29, the liquid crystal display according to the present embodiment includes first and second light conversion members 401 and 402.

The light guide plate 200 is provided therein with first and second grooves 203 and 204.

The first groove 203 is formed in a top surface 207 of the light guide plate 200. The second groove 204 is formed in a bottom surface 209 of the light guide plate 200. In this case, the top surface 207 of the light guide plate 200 is provided in opposition to the bottom surface 209 of the light guide plate 200. In addition, an incident surface 208 of the light guide plate 200 extends from the top surface 207 of the light guide plate 200 to the bottom surface 209 of the light guide plate 200.

The first and second grooves 203 and 204 are deviated from each other. In other words, when viewed in a plan view, the first and second grooves 203 and 204 may be deviated from each other. In addition, the first groove 203 is overlapped with the second groove 204. In addition, when viewed in a side view, the first and second grooves 203 and 204 are overlapped with each other. In more detail, when viewed from the light emitting diode, the first and second grooves 203 and 204 may be overlapped with each other.

The first light conversion member 401 is inserted into the first groove 203, and the second light conversion member 402 is inserted into the groove 204. Similarly, when viewed from the light emitting diode, the first and second grooves 203 and 204 may be overlapped with each other.

As described above, according to the liquid crystal display of the embodiment, at least two light conversion members 401 and 402 are inserted into the top and bottom surfaces of the light guide plate 200. Therefore, almost all of lights emitted from the light emitting diodes 300 pass through the first light conversion member 401 or the second light conversion member 402.

Therefore, the liquid crystal display according to the embodiment can represent improved color representation.

Figure 30:
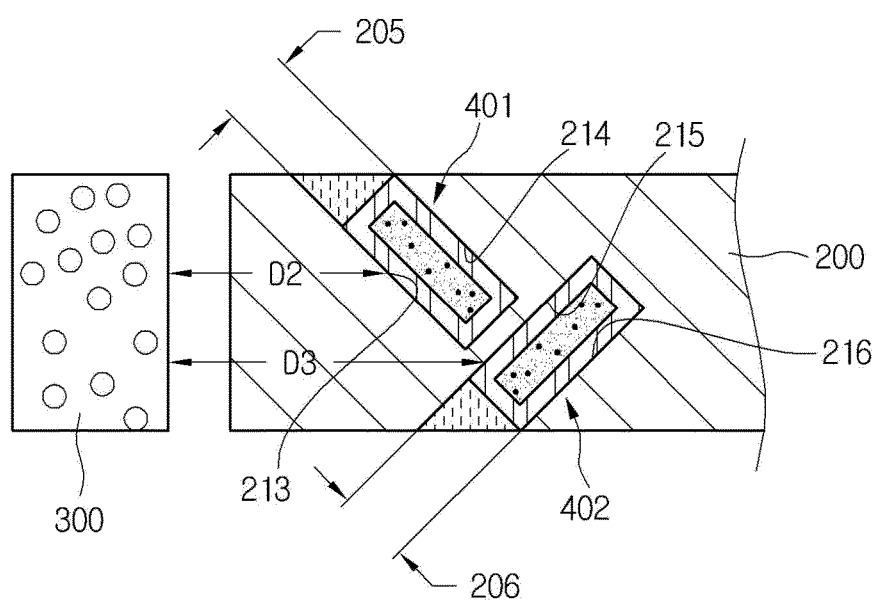
FIG. 30 is a sectional view showing a light emitting diode, a light guide plate, and first and second light conversion members according to a twelfth embodiment.

FIG. 30 is a sectional view showing a light emitting diode, a light guide plate, and first and second light conversion members according to a twelfth embodiment. Hereinafter, the present embodiment will be described by making reference to the description of the liquid crystal display according to the previous embodiment. In other words, the description of the previous embodiments will be incorporated in the description of the present embodiment except for the modification.

Referring to FIG. 30, the first light conversion member 401 is inserted into the light guide plate 200 in a direction in which the first light conversion member 401 is inclined with respect to the top surface of the light guide plate 200. In addition, the second light conversion member 402 is inserted into the light guide plate 200 in a direction in which the second light conversion member 402 is inclined with respect to the bottom surface of the light guide plate 200.

The first groove 205 includes first and second inner lateral sides 213 and 214 inclined with respect to the top surface of the light guide plate 200. The first inner lateral side 213 is provided in opposition to the second inner lateral side 214 while being parallel to the second inner lateral side 214. Similarly, the second groove 206 includes third and fourth inner lateral sides 215 and 216 inclined with respect to the bottom surface of the light guide plate 200. The third inner lateral side 215 is provided in opposition to the fourth inner lateral side 216 while being parallel to the fourth inner lateral side 216.

The first and second light conversion members 401 and 402 are inserted into the first and second grooves 205 and 206, respectively, in such a manner that the first and second light conversion members 401 and 402 are inclined with respect to the first and second grooves 205 and 206, respectively.

The first and second light conversion members 401 and 402 may be inclined toward the light emitting diode 300. Therefore, as the first groove 205 becomes deeper, a distance D2 between the light emitting diode 300 and the first light conversion member 401 may be gradually increased. In addition, as the second groove 206 becomes deeper, a distance D3 between the light emitting diode 300 and the second light conversion member 402 may be gradually increased.

As described above, the first and second light conversion members 401 and 402 are inserted into the light guide plate 200 in the direction in which the first and second light conversion members 401 and 402 are inclined with respect to the light guide plate 200. Therefore, the light emitted from the light emitting diode 300 may pass through the first and second light conversion members 401 and 402 on a longer path.

Therefore, the liquid crystal display according to the present embodiment can represent improved color representation.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a light source;
    a light guide part to receive a light emitted from the light source;
    a light conversion member between the light source and the light guide part;
    a spacer between the light source and the light conversion member; and
    a display panel on the light guide part,
    wherein an effective display region to display an image is defined in the display panel provided on the light guide part,
    wherein a central region corresponding to the effective display region and an outer region around the central region are defined in the light guide part, and
    wherein the light conversion member is provided in the outer region.

2. The display device of claim 1, wherein the spacer has a width in a range of about 200 μm to about 2.5 mm.

3. The display device of claim 2, wherein the spacer adheres to the light conversion member and the light source.

4. The display device of claim 1, wherein the spacer has a refractive index corresponding to a refractive index of the light guide part.

5. The display device of claim 1, further comprising a support part extending from the spacer to the light guide part.

6. The display device of claim 5, wherein the spacer, the support part, and the light guide part are integrally formed with each other.

7. A display device comprising:
    a light guide plate;
    a light source at one side of the light guide plate;
    a light conversion member in a groove defined in the light guide plate; and
    a display panel on the light guide plate,
    wherein an effective display region to display an image is defined in the display panel provided on the light guide plate,
    wherein a central region corresponding to the effective display region and an outer region around the central region are defined in the light guide plate, and
    wherein the light conversion member is provided in the outer region.

8. The display device of claim 7, further comprising an adhering member filled in the groove to adhere to the light conversion member and an inner lateral side of the groove.

9. The display device of claim 7, wherein the light guide plate comprises:
    a spacer between the light source and the light conversion member; and
    a light guide part in which the light conversion member is sandwiched between the spacer and the light guide part.

10. The display device of claim 9, wherein the light guide plate further comprises a first support part extending from the spacer to the light guide part while supporting the light conversion member.

11. The display device of claim 10, wherein the light guide plate further comprises a second support part facing the first support part while interposing the light conversion member therebetween.

12. The display device 7, wherein the groove comprises a first inner lateral side inclined with respect to a top surface of the light guide plate, and a distance between the first inner lateral side and the light conversion member is gradually decreased as the groove becomes deeper.

13. The display device of claim 7, wherein a first groove is formed in a top surface of the light guide plate, and
    a second groove is formed in a bottom surface provided in opposition to the top surface of the light guide plate, and
    wherein the light conversion member comprises:
    a first light conversion member in the first groove; and
    a second light conversion member in the second groove.

14. The display device of claim 13, wherein the first and second light conversion members are overlapped with each other when viewed from the light source.

15. A display device comprising:
    a light guide plate;
    a light source to emit a light to the light guide plate;
    a light conversion member in the light guide plate; and
    a display panel on the light guide plate,
    wherein the light guide plate directly adheres to at least one surface of the light conversion member,
    wherein an effective display region to display an image is defined in the display panel provided on the light guide plate,
    wherein a central region corresponding to the effective display region and an outer region around the central region are defined in the light guide plate, and
    wherein the light conversion member is provided in the outer region.

16. A display device of claim 15, wherein the light guide plate comprises:
    a light incident part adhering to an incident surface of the light conversion member; and
    a light guide part adhering to an exit surface of the light conversion member, which is provided in opposition to the incident surface.

17. The display device of claim 16, wherein the light guide plate further comprises:
    a first support part integrally formed with the light incident part and the light guide part; and
    a second support part integrally formed with the light incident part and the light guide part,
    wherein the light conversion member is sandwiched between the first and second support parts.

18. The display device of claim 15, wherein an incident surface of the light conversion member is exposed out of the light guide plate, and the incident surface is provided in opposition to the light source.

19. The display device of claim 18, wherein the light conversion member comprises an exit surface provided in opposition to the incident surface, and the exit surface directly adheres to the light guide plate.

* * * * *